(12) United States Patent
Miller

(10) Patent No.: US 7,116,091 B2
(45) Date of Patent: Oct. 3, 2006

(54) RATIOMETRIC STUD SENSING

(75) Inventor: Lawrence F. Miller, Los Gatos, CA (US)

(73) Assignee: Zircon Corporation, Campbell, CA (US)

(*) Notice: Subject to any disclaimer, the term of this patent is extended or adjusted under 35 U.S.C. 154(b) by 104 days.

(21) Appl. No.: 10/794,356

(22) Filed: Mar. 4, 2004

(65) Prior Publication Data

US 2005/0194959 A1 Sep. 8, 2005

(51) Int. Cl.
*G01R 19/10* (2006.01)
*G01R 27/26* (2006.01)

(52) U.S. Cl. ............................ 324/67; 324/658

(58) Field of Classification Search ............ 324/67, 324/326, 658, 663, 665, 662, 686
See application file for complete search history.

(56) References Cited

U.S. PATENT DOCUMENTS

| | | | |
|---|---|---|---|
| 3,278,843 A | 10/1966 | Deming | |
| 3,662,258 A | 5/1972 | Murphy et al. | |
| 3,704,413 A | 11/1972 | Blevins | |
| 3,836,848 A | 9/1974 | Blevins | |
| 3,893,025 A * | 7/1975 | Humphreys, Jr. | 324/326 |
| 4,041,382 A | 8/1977 | Washburn | |
| 4,067,225 A | 1/1978 | Dorman et al. | |
| 4,086,528 A | 4/1978 | Walton | |
| 4,099,118 A | 7/1978 | Franklin et al. | |
| 4,130,796 A | 12/1978 | Shum | |
| 4,322,678 A | 3/1982 | Capots et al. | |
| 4,464,622 A | 8/1984 | Franklin | |
| 4,639,666 A | 1/1987 | Strosser et al. | |
| 4,676,100 A | 6/1987 | Eichberger | |
| 4,752,727 A | 6/1988 | Schneider | |
| 4,847,552 A | 7/1989 | Howard | |
| 4,853,617 A | 8/1989 | Douglas et al. | |
| 4,868,910 A | 9/1989 | Maulding | |
| 4,939,455 A | 7/1990 | Tsugawa | |
| 4,947,116 A | 8/1990 | Welcome et al. | |
| 4,992,741 A | 2/1991 | Douglas et al. | |
| 5,023,494 A | 6/1991 | Tsukii et al. | |

(Continued)

FOREIGN PATENT DOCUMENTS

EP 1 341 005 A2 9/2003

(Continued)

OTHER PUBLICATIONS

International Search Report mailed on May 30, 2005 for PCT patent application No. PCT/US2005/003348 filed Feb. 4, 2005. 4 pages.

(Continued)

*Primary Examiner*—Edward Lefkowitz
*Assistant Examiner*—Kenneth J. Whittington
(74) *Attorney, Agent, or Firm*—Morrison & Foerster LLP

(57) ABSTRACT

A stud or joist sensor device and associated sensing method using a ratio of capacitance measurements from a plurality of capacitive sensing elements. The device locates a feature of an object or discontinuity behind a surface or wall, such as an edge and/or a center of a stud behind the surface, a joist under a floorboard, a gap behind sheetrock, a metal conductor behind a surface or the like. The device may be moved over a surface, thereby detecting changes in capacitance. The change in capacitance is due to the effective dielectric constant caused by the passage over an object such as a stud. When two capacitive sensing elements provide equivalent capacitance measures, the device is over a centerline of the stud. When a ratio of the capacitance measurements equals a transition ratio, the device is over an edge of the stud.

37 Claims, 18 Drawing Sheets

U.S. PATENT DOCUMENTS

| | | | |
|---|---|---|---|
| 5,283,528 A * | 2/1994 | van Seeters | 324/679 |
| 5,352,974 A | 10/1994 | Heger | |
| 5,425,367 A | 6/1995 | Shapiro et al. | |
| 5,457,394 A * | 10/1995 | McEwan | 324/642 |
| 5,485,092 A * | 1/1996 | Fortin | 324/457 |
| 5,594,353 A * | 1/1997 | Hemphill | 324/681 |
| 5,617,031 A * | 4/1997 | Tuttle | 324/326 |
| 5,619,128 A | 4/1997 | Heger | |
| 5,812,057 A * | 9/1998 | Hepworth et al. | 340/540 |
| 5,917,314 A | 6/1999 | Heger et al. | |
| 6,023,159 A | 2/2000 | Heger | |
| 6,198,271 B1 * | 3/2001 | Heger et al. | 324/67 |
| 6,211,662 B1 * | 4/2001 | Bijawat et al. | 324/67 |
| 6,501,284 B1 | 12/2002 | Gozzini | |
| 6,552,677 B1 | 4/2003 | Barnes et al. | |
| 6,556,935 B1 * | 4/2003 | Morimura et al. | 702/104 |
| 6,587,093 B1 | 7/2003 | Shaw et al. | |
| 6,650,126 B1 | 11/2003 | Indihar | |
| 6,700,391 B1 | 3/2004 | Strack et al. | |
| 6,804,262 B1 | 10/2004 | Vogel et al. | |
| 6,894,508 B1 | 5/2005 | Sanoner et al. | |
| 2005/0253597 A1 | 11/2005 | Miller | |

FOREIGN PATENT DOCUMENTS

EP    1 341 005 A3    9/2003

OTHER PUBLICATIONS

Wang, B. et al. (May 19-21, 1997). "High-Accuracy Circuits for On-Chip Capacitive Ratio Testing and Sensor Readout," *IEEE Instrumentation and Measurement Technology Conference, Ottawa, Canada* (May 19-21, 1997) 2:1169-1172.

International Search Report mailed on Jun. 8, 2005 for PCT patent application No. PCT/US2005/004586 filed Feb. 11, 2005.

* cited by examiner

FIG. 4A
(Prior Art)
FIG. 4B
(Prior Art)
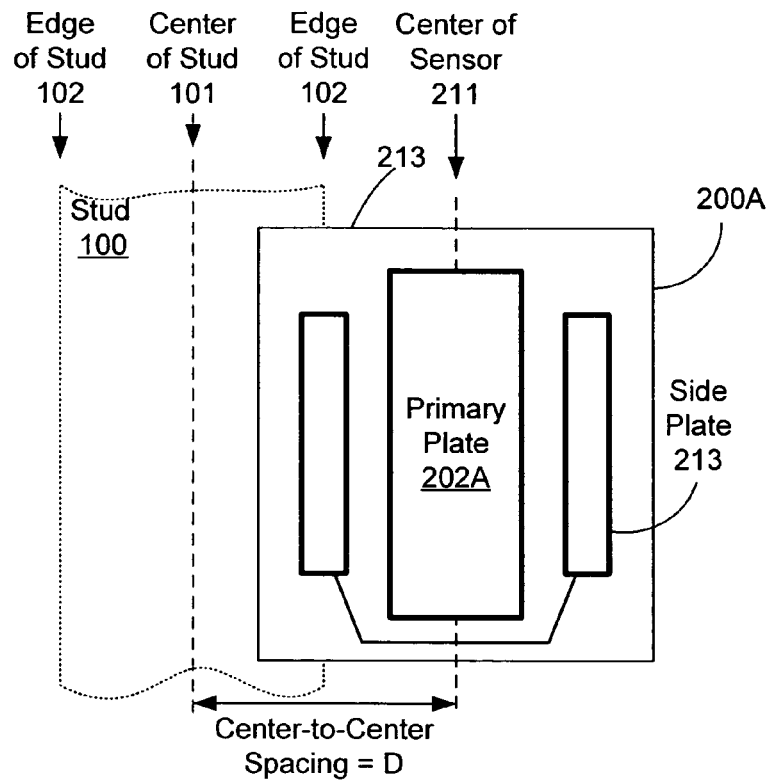
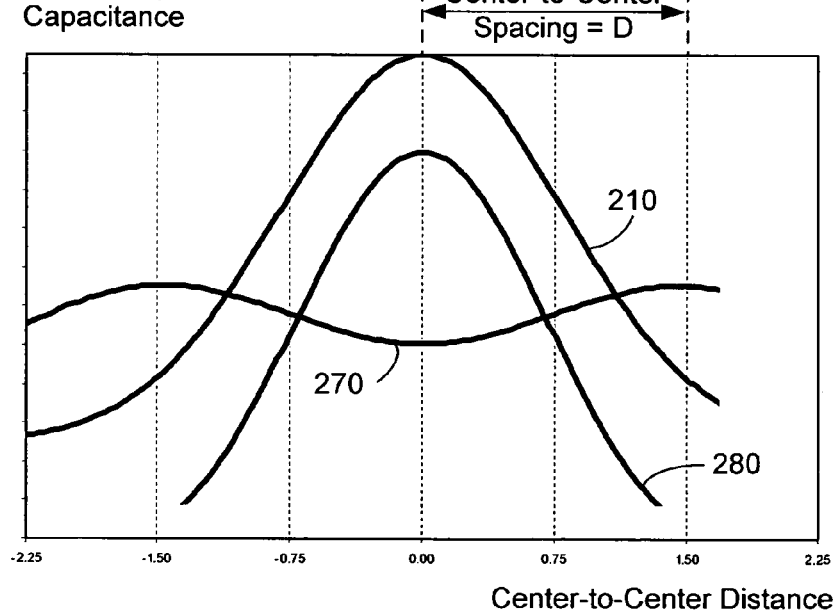

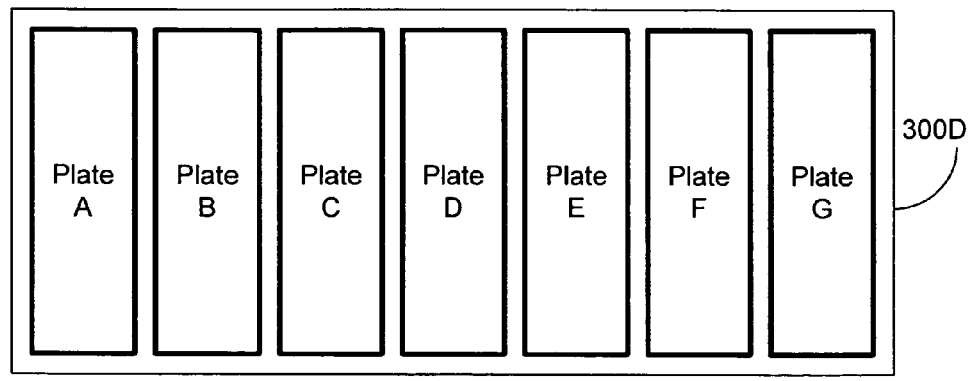
FIG. 9
FIG. 10
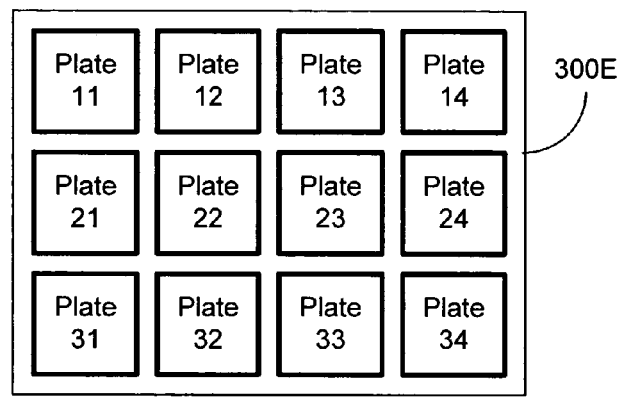
FIG. 11
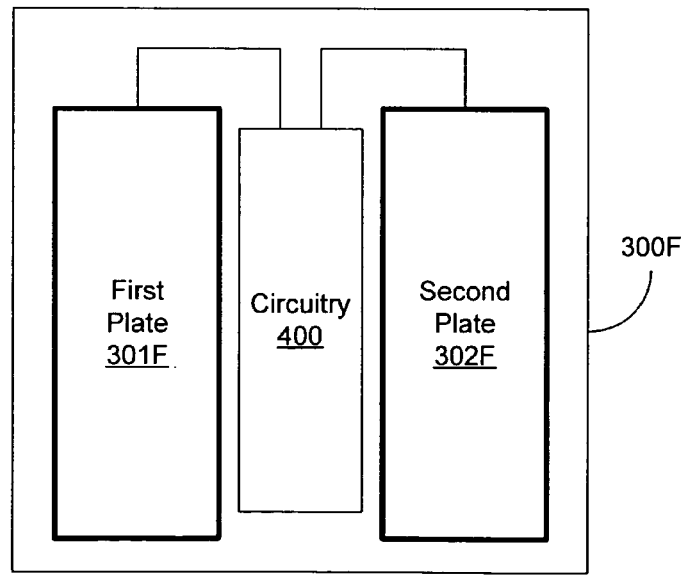

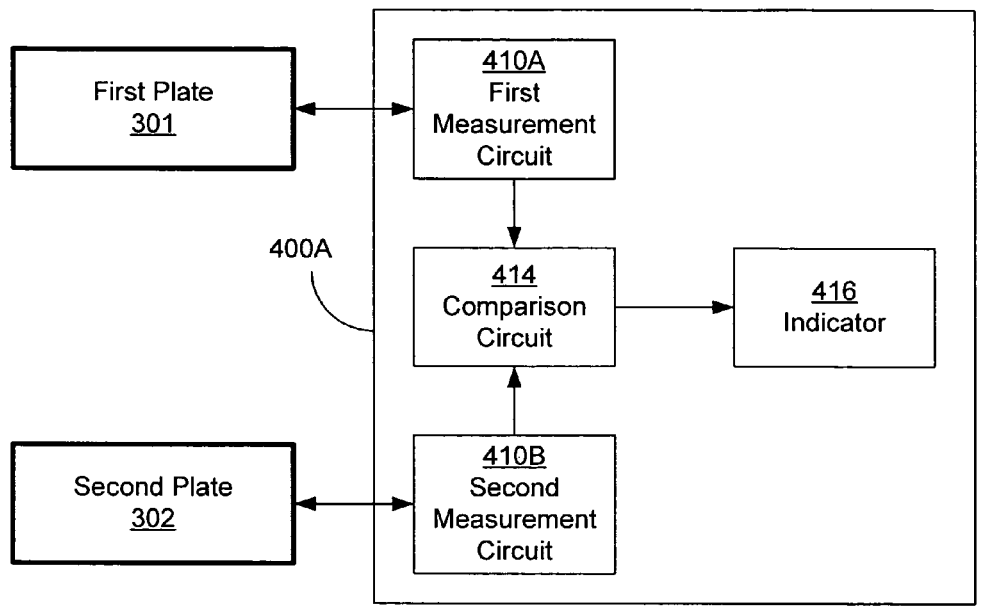
FIG. 12
FIG. 13
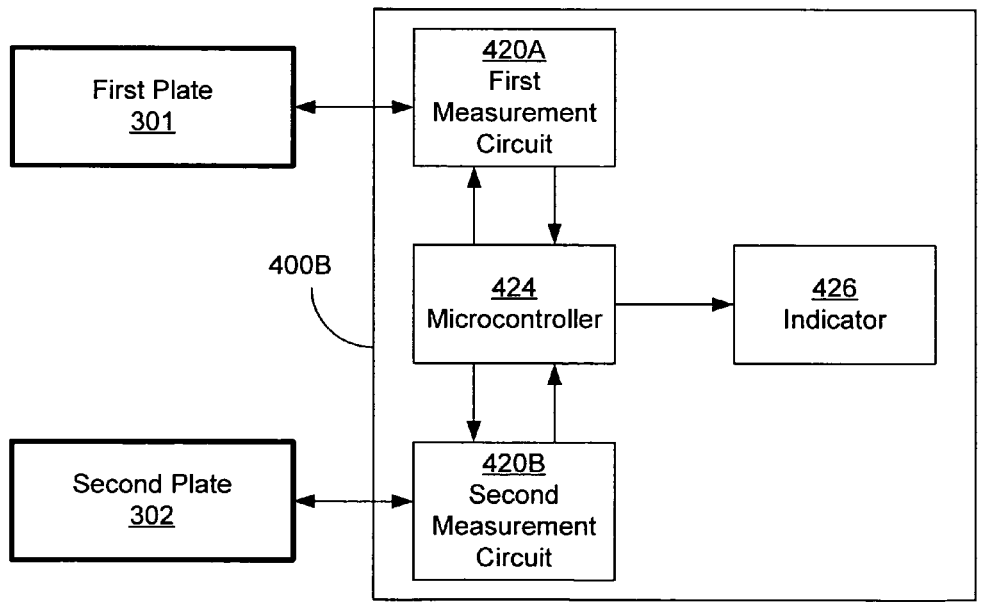

RATIOMETRIC STUD SENSING

BACKGROUND OF THE INVENTION

1. Field of the Invention

This invention relates to an electronic sensor, and, in particular, to a sensor suitable for detecting the location of an object behind a variety of surfaces, including walls, floors and other non-electrically conductive structures. More specifically, the invention relates to an electronic sensor used to detect centerlines and edges of wall studs, floor joists, and the like.

2. Description of the Prior Art

U.S. Pat. No. 4,464,622 entitled "Electronic wall stud sensor," issued Aug. 7, 1984, and incorporated in its entirety by reference herein, discloses an electronic wall stud sensor particularly suitable for locating a stud positioned behind a wall surface. (A "stud" is a structural member of a building to which an interior wall surface such as wall board or paneling is affixed.) Typically in the U.S., "2-by-4" wooden studs are used in construction. Nominally, a 2-by-4 stud is 51 mm (2 inches) wide and 102 mm (4 inches) deep and of any suitable length. The actual dimensions of a 2-by-4 are more typically 38 mm (1½ inches) wide and 89 mm (3½ inches) deep. Use of English (inches) units and U.S. stud sizes here is in conformance with U.S. construction practice and is not intended to be limiting, but is only illustrative. Finding studs is a typical problem for building repairs, picture hanging, etc.

The sensor detects the stud by measuring a change in capacitance due to a change in the dielectric constant along the wall. Due to the placement of the studs, a wall surface exhibits changing dielectric constants while the sensor is moved along the wall surface. The sensor includes a plurality of capacitor plates, a circuit for detecting changes in the capacitance, and an indicator.

The plurality of capacitor plates is mounted in the sensor such that they can be positioned close to a wall's surface. When the capacitor plates are drawn along the surface, the circuit detects a change in the capacitance of the plates due to a change in the average dielectric constant of the surface. The capacitor plates are used to measure the effective capacitance or change in capacitance of a wall. Before detection begins, the sensor first performs a calibration to null out the effect of a wall in the absence of a stud. The capacitor plates are composed of a center plate and a symmetric pair of electrically connected edge plates. The difference in capacitance between the center and edge plates is used to determine the location of the edge of a stud. The centerline of the stud is then determined by finding both the left and right edges of the stud and then measuring to the middle of the distance between the edges. Thus, multiple measurements must be made in order to determine the centerline of the stud. The indicator indicates the change in capacitance of the capacitor plate, thereby alerting an operator to the wall stud position. The indicator also alerts the operator when calibration is occurring.

While this procedure is effective in determining the centerline of a stud, significant errors in determining the location of the stud's edges can occur. One factor is the depth of the stud behind the surface. Due to the thickness of the sheetrock (also referred to as gypsum wall board and which has a thickness of 16 mm or equivalently ⅝ of an inch) or other wall surface material, a "ballooning" effect may distort the perceived width of the stud. The closer a stud is positioned to the surface, the wider the stud will appear when sensed in this way. Similarly, the farther or deeper a stud is positioned, the narrower the stud will appear. This ballooning effect is exacerbated when the sensitivity of the sensor is increased to aid in detecting deeper studs. The ballooning may be asymmetric due to electrical wires, metallic pipes and other objects in close proximity to the stud, which in turn may lead to a reduced the ability to accurately determine a stud's centerline. In the case of extreme ballooning, location of an edge of a stud can be inaccurately indicated by as much as 51 mm (2 inches). Similarly, the centerline of the stud may be so inaccurately indicated that it is completely off the actual stud location.

A first method of compensating for the ballooning effect is shown in U.S. Pat. No. 6,023,159, entitled "Stud sensor with dual sensitivity," issued Feb. 8, 2000, and incorporated by reference herein in its entirety. Unfortunately, using a dual sensitivity control only partially minimizes the ballooning effect.

A second method of compensating for the ballooning effect is shown in U.S. Pat. No. 5,917,314, entitled "Electronic wall-stud sensor with three capacitive elements," issued Jun. 29, 1999, and incorporated by reference herein. This second method discloses using three parallel sensing plates and using sums and differences between the various plate capacitances to determine the centerline and edges of a stud.

The above methods, which use electronic wall stud sensors, are unable to reliably and accurately sense an edge of a stud (or other structural member) through surfaces that are thicker than 38 mm (1½ inches). Additionally, these sensors, if overly sensitive, falsely indicate the presence of non-existing studs. Therefore, known sensors have disadvantages.

BRIEF SUMMARY

An apparatus and method for determining a feature of a structure while reducing effects of an unknown thickness of the member located behind a surface are provided. The feature may be a centerline and/or an edge of an object or member, such as a stud or joist. The feature may also be an edge of a gap or discontinuity of the structure. The sensor apparatus includes a plurality of capacitive plates. The sensor may also include circuitry to sense an effective capacitance created by a plate, the covering and objects behind the covering. The sensor may compute a ratio between the capacitance measurements of a pair of the plates. A ratio of approximately one may indicate a centerline of a stud or joist or similar member. A ratio in a predetermined range may indicate an edge of a stud or joist.

Some embodiments provide a method of finding a feature behind a surface using a sensor having first and second plates, the method comprising the acts of: moving the sensor and surface adjacent one another; measuring a first capacitance of a first capacitor including the first plate; measuring a second capacitance of a second capacitor including the second plate; and computing a ratio of the first and second capacitances.

Some embodiments provide a method of finding a feature behind a surface using a sensor having first and a second plates of approximately equal areas, the method comprising the acts of: moving the sensor and surface adjacent one another; measuring a first capacitance of a first capacitor including the first plate, measuring a second capacitance of a second capacitor including the second plate; comparing the first and second capacitances; and repeating the acts of measuring and comparing.

Some embodiments provide a sensor for finding a feature of a structure comprising: a first plate having a first capacitance and adapted for forming a first capacitor with the structure; a second plate having a second capacitance and adapted for forming a second capacitor with the structure; a first measurement circuit coupled to the first plate, the first measurement circuit measuring a first capacitance value of the first capacitor; a second measurement circuit coupled to the second plate, the second measurement circuit measuring a second capacitance value of the second capacitor; and a comparison circuit coupled to the first and second measurement circuits, the comparison circuit generating a ratio of the first and second capacitance values.

Some embodiments provide a sensor comprising: a first and a second plate positioned in about the same plane and spaced apart, and adapted to be located adjacent a surface; a measurement circuit coupled to the first and second plates thereby to measure a capacitance value of each of the plates; and a comparison circuit coupled to receive the measured capacitance values and determine a ratio between a change in the measured capacitance values.

BRIEF DESCRIPTION OF THE DRAWINGS

FIG. 4A illustrates a plan view of a second prior art capacitive sensor having a primary plate and two side plates positioned at a lateral distance away from a hidden stud.

FIG. 4B shows a graph of capacitance measurements of a primary plate and secondary (side) plates versus a lateral distance between a sensor and a hidden stud.

FIG. 9 illustrates a plan view of a capacitive sensor having a series of three or more plates, in accordance with the present invention.

FIG. 10 illustrates a plan view of a capacitive sensor having grid of plates.

FIG. 11 illustrates a plan view of a ratiometric capacitive sensor having two primary plates and circuit positioned between the two primary plates, in accordance with the present invention.

FIG. 12 shows a block diagram of a ratiometric capacitive sensor having two primary plates and circuitry, in accordance with the present invention.

FIG. 13 shows block diagram of another ratiometric capacitive sensor having two primary plates and circuitry, in accordance with the present invention.

DETAILED DESCRIPTION

A ratiometric capacitive sensor may use capacitance measurements from multiple conductive plates to determine the presence of objects, such as studs and joists, hidden behind a covering surface such as a wall, floor, ceiling, etc. In some embodiments, a ratiometric capacitive sensor includes two conductive plates. Each conductive plate acts as part of a separate capacitor. Circuitry coupled to each plate measures an effective change in capacity of the separate capacitors, which is effected by the density of material in close proximity to the plates. As a result, the combination of a wall or other surface covering and an underlying stud or other member has a larger capacitance than a wall covering alone without a stud. A capacitance measurement may be taken from each plate. The capacitance measurement from one plate may then be compared to a capacitance measurement of another plate to determine boundaries and features of the materials in the vicinity of the plates.

Figure 1A:
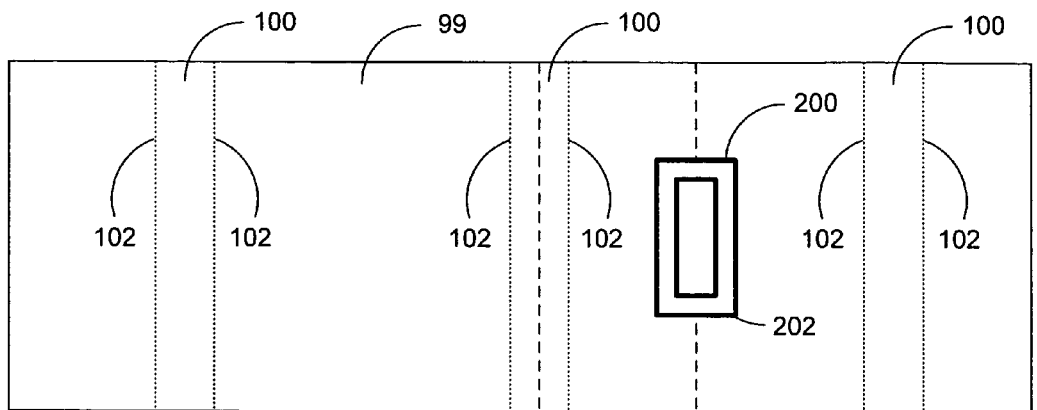
FIGS. 1A–1C illustrate a plan view of a prior art single plate capacitive sensor positioned against a wall at a lateral distance away from a hidden stud and the capacitance produced by the sensor and the wall.

FIG. 1A illustrates a plan view of a known capacitive sensor 200 having a single plate 202 positioned against a wall 99 at a lateral distance D away from a hidden stud 100. The stud 100 has two edges 102 and defines a centerline 101 relative to its positioning to the wall 99.

Figure 1B:
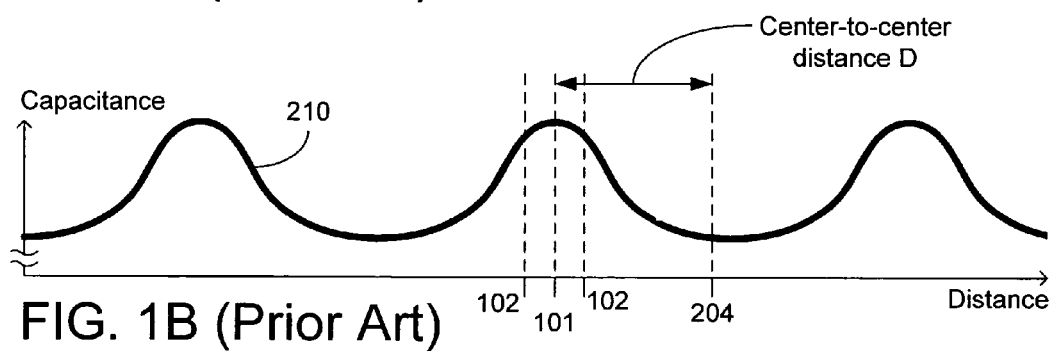
Figure 1C:
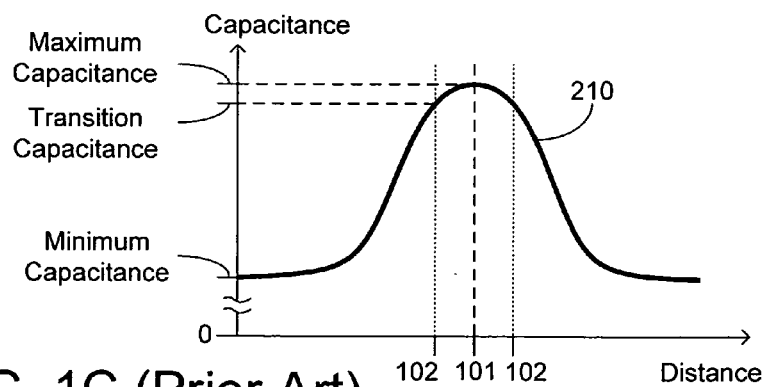

FIGS. 1B and 1C illustrate a capacitance produced between the plate 202 and the wall 99. A capacitance curve 210 shows peaks at the centerline 101 of each stud 100 and a valley between a pair of studs 100. The capacitance curve 210 shows a minimum capacitance value when the sensor 200 is directly between the pair of studs 100. To mark the centerline of a stud 100, a sensor 200 must detect the peak of the capacitance curve 210.

Unfortunately, the absolute apex of curve 210 is difficult to detect because of the relative flatness of the capacitance curve 210 as the sensor 200 is centered or nearly centered over a stud 100. For this reason, sensor 200 is not used to find centerlines 101 of studs 100. Therefore, sensor 200 only indicates edges 102 of a stud 100. As capacitance curve 210 passes through a transition capacitance value, the centerline 204 of the sensor 200 may be approximately over an edge 102 of the stud 100. While the capacitance is above this value, the sensor 200 may indicate it is over the stud 100. The transition capacitance value is set at the factor and may not be useful in locating edges and centers of studs located behind wall structures having different thicknesses and studs having different widths.

Figure 2A:
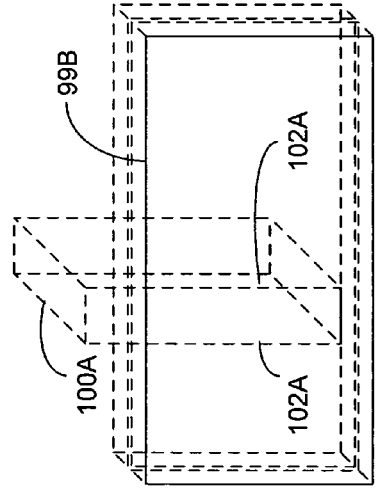
FIGS. 2A–2D illustrates combinations of hidden studs and wall coverings of different widths and thicknesses as detectable in accordance with the invention.
Figure 2B:
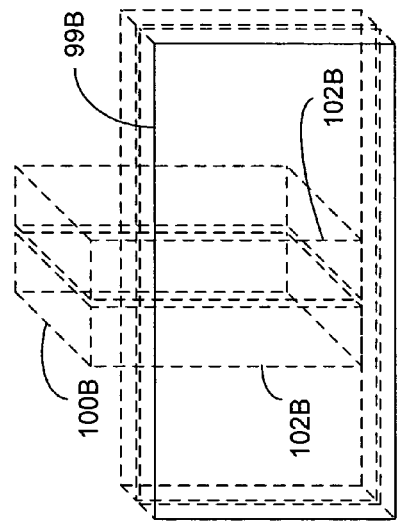
Figure 2C:
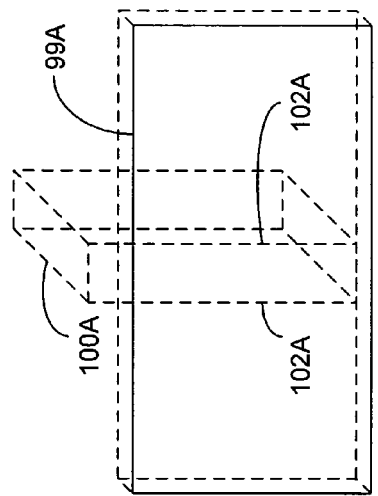
Figure 2D:
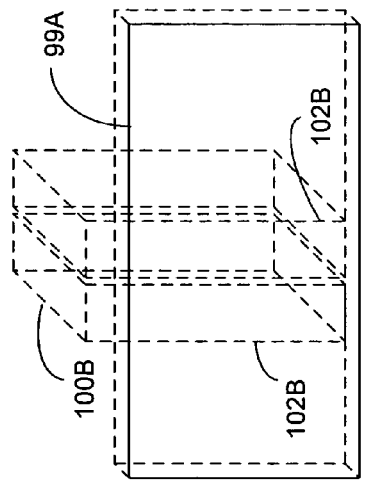

FIGS. 2A–2D illustrate various wall structures having hidden studs 100 of different widths and wall coverings 99 of different thicknesses as encountered in typical buildings. FIG. 2A shows a single stud 100A presenting edges 102A hidden behind a single layer of sheetrock 99A. FIG. 2B shows two studs 100B side-by-side presenting edges 102B hidden behind a single layer of sheetrock 99A. FIG. 2C shows a single stud 100A presenting edges 102A hidden behind a double layer of sheetrock 99B. FIG. 2D shows two studs side-by-side presenting edges 102B hidden behind a double layer of sheetrock 99B. Each combination of widths and thicknesses presents a unique capacitance curve to a sensor 200 as the sensor 200 passes over the stud or studs 100.

Figure 3:
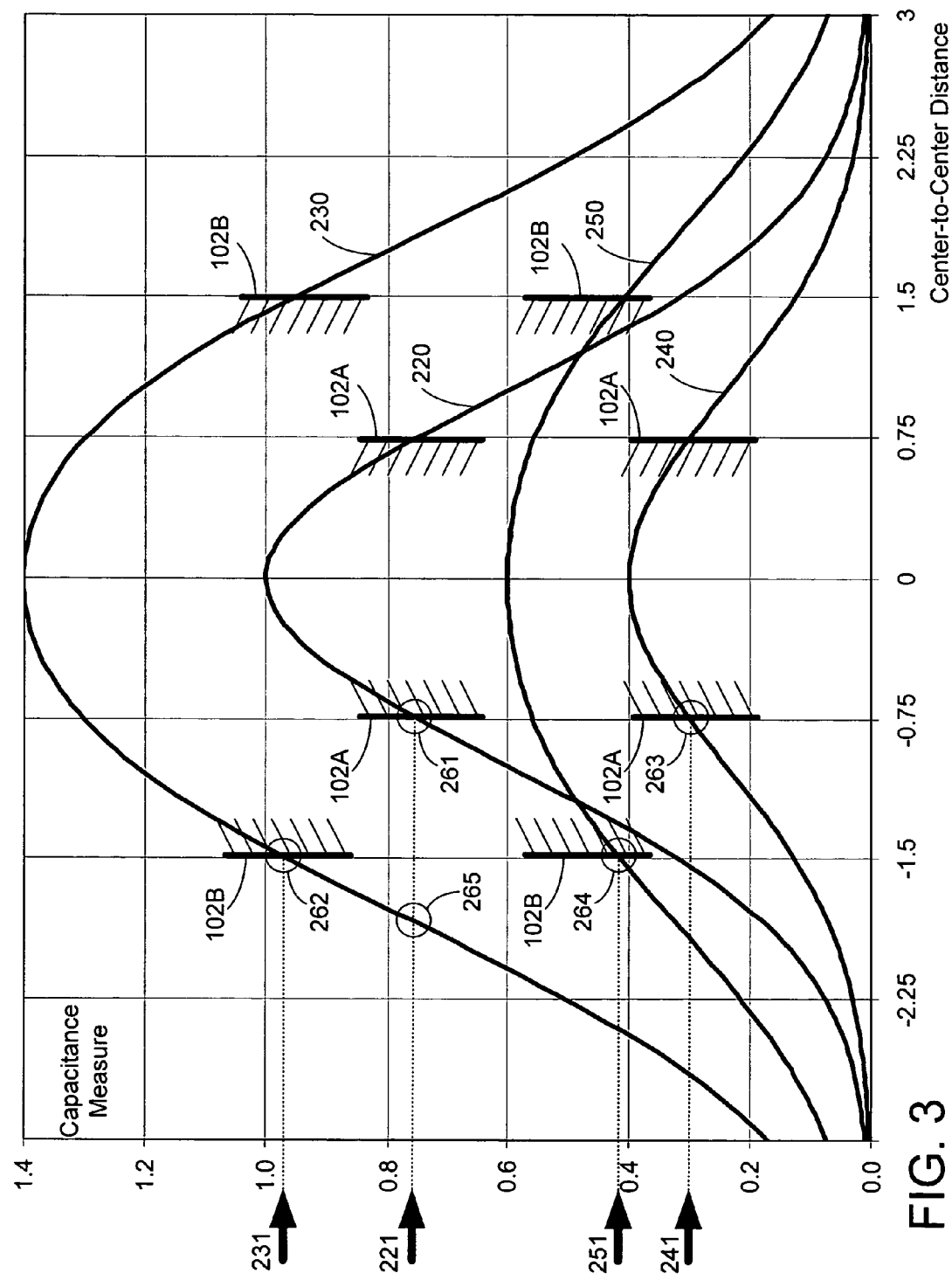
FIG. 3 illustrates capacitance measurements versus distance for various wall structures.

FIG. 3 graphs a series of capacitance measurement curves versus distance for the various wall structures shown in FIGS. 2A–2D. The distance may be a measure of the distance between a centerline 101 of stud 100 or group of studs and the centerline of a capacitive plate, e.g., plate 202 of FIG. 1A. The capacitance measurement may be a measure of a change in capacitance that is formed by the capacitive plate, e.g., plate 202, and the wall structure formed with one or more studs 100 providing an unknown width and a wall covering 99 having an unknown thickness.

Curve 220 illustrates a capacitance detected over a wall structure having a single-width stud 100A defining edges 102A hidden by a single sheet of wall covering 99A, e.g., as shown in FIG. 2A. Curve 230 illustrates a capacitance detected over a wall structure having a double-width stud 100B defining edges 102B hidden by a single sheet of wall covering 99A, e.g., as shown in FIG. 2B. Curve 240 illustrates a capacitance detected over a wall structure having a single-width stud 100A defining edges 102A and hidden by two sheets of wall covering 99B, e.g., as shown in FIG. 2C. Curve 250 illustrates a capacitance detected over a wall structure having a double-width stud 100B defining edges 102B and hidden by two sheets of wall covering 99B, e.g., as shown in FIG. 2D.

As the capacitance reaches a predetermined threshold value, the sensor 200 may indicate an edge 102 of a stud 100 is detected. For each particular wall structure, however, a unique threshold value is required to properly locate an edge 102 of a stud 100. For example, curve 220 may use threshold value 221 to indicate when the sensor 200 is centered over an edge 102A as shown at point 261. Similarly, curves 230, 240 and 250 may use respective threshold values 231, 241 and 251 when sensor 200 is centered over an edge 102A or 102B as shown at respective points 262, 263 and 264.

FIG. 3 also shows that capacitance measurements may be normalized such that a single stud 100A hidden behind a single layer of sheetrock 99A, as shown in FIG. 2A, may produce a peak capacitance measurement value of 1.0 and a minimum calibrated value of 0.0 as seen from curve 220. Measurements of other wall structures may be normalized to a single-stud single-layer construction. Curve 230 shows a relative maximum capacitance value of 1.4. Similarly, curves 240 and 250 show relative maximum capacitance values of 0.4 and 0.6, respectively.

A sensor using a single fixed threshold value, e.g., threshold value 221, for various wall structures, will sometime correctly and other times incorrectly identify locations of edges 102 of a stud 100. When the assumptions of the wall thickness and stud width are correct, the location of an edge 102 may be properly identified. For example, a sensor using a threshold value 221 calibrated for a single layer of sheetrock and a single stud may accurately determine the edges 102A of a single stud 100A behind a single layer of sheetrock 99A, as shown by point 261.

If a sensor uses a single fixed threshold value designed for a particular wall structure that is different from the actual structure under test, the sensor 200 may provide false edge indications. For example, a sensor using a threshold value 221, which is set for a single stud, may incorrectly indicate an edge's position rather than the actual edge 102B of a double stud, as shown at point 265. In the example shown, a ballooning effect has occurred such that a false edge indication shows the stud edges 102B are positioned in a manner making the stud appear wider than it actually is.

FIG. 4A illustrates a plan view of a capacitive sensor 200A having a primary plate 202A and two side plates 213 as described in U.S. Pat. No. 5,917,314. The sensor 200A is positioned at a lateral distance D away from a hidden stud 100. The two side plates 213 are electrically connected to act as a single capacitive plate. The side plates 213 assist in sharpening the detection of the hidden stud 100. The capacitance sensed by the side plates 213 are subtracted from the capacitance of the primary plate 202A.

FIG. 4B shows a graph of capacitance measurements of a primary plate 202A and side plates 213 versus a lateral distance D between a sensor 200A and a hidden stud 100. Curve 210 shows a change in capacitance of the primary plate 202A of sensor 200A. The side plates 213 present a dual peak curve 270. Each peak represents a position of the sensor 200A when one of the side plates 213 is centered over the stud 100.

A difference calculation between curve 210 of a primary plate 202A and the curve 270 of side plates 213 results in curve 280, which is a narrower than curve 210 of the primary plate 202A. Unfortunately, the measured capacitances shown in curves 210 and 270 and the difference in capacitances, as shown in curve 280, do not provide a direct indication of the location of an edge of a stud if the thickness of the separating material and the width of the stud are unknown since different wall structures present different nominal capacitances. Using a fixed difference threshold to indicate a stud's edge regardless of wall covering thickness may erroneously indicate an edge is closer to or farther from the centerline of the stud than is actually correct as described above with reference to FIGS. 2A–2D. Additionally, the rounded top of curve 280, though narrower than curve 210, still may not be sharp enough to pinpoint the location of a centerline 101 of a stud 100.

Figure 5A:
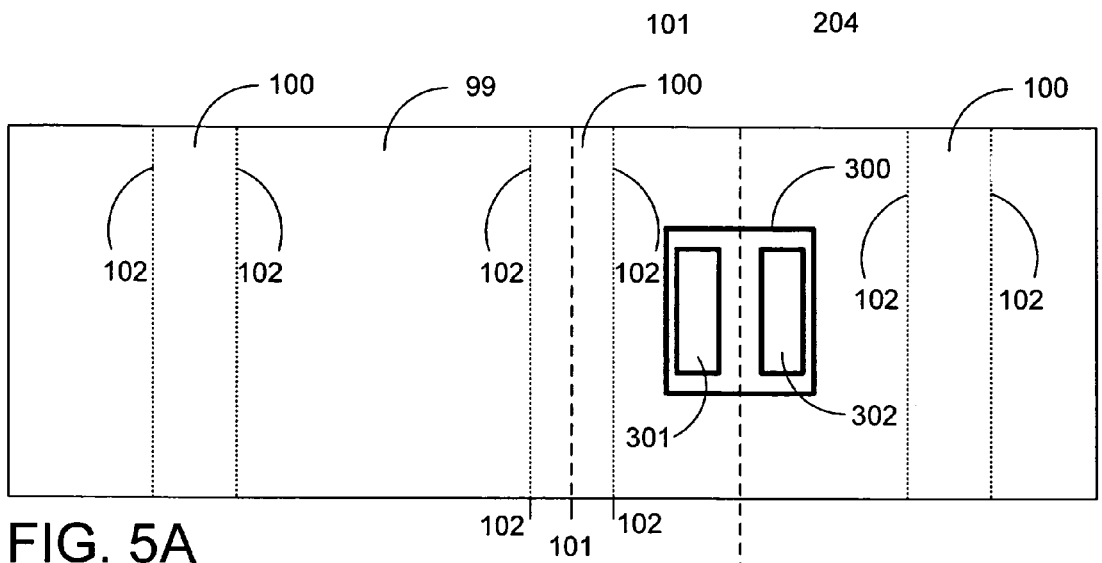
FIGS. 5A–5D illustrate a plan view of and capacitance produced by a ratiometric capacitive sensor having two primary plates, in accordance with the present invention, positioned at a lateral distance away from an object, such as a hidden stud.

FIG. 5A illustrates a plan view of a ratiometric capacitive sensor 300 having two primary plates 301, 302, in accordance with the present invention. The sensor 300 is positioned against a wall 99 at a lateral distance D away from a hidden stud 100. The stud 100 has two edges 102 and defines a centerline 101 relative to its positioning along the wall 99. Additionally, the sensor 300 defines a centerline 304 that may be equally positioned between a first plate 301 and a second plate 302. In some embodiments, associated circuitry (not shown) operates to independently measure values indicative of a capacitance of each plate 301 and 302.

Figure 5B:
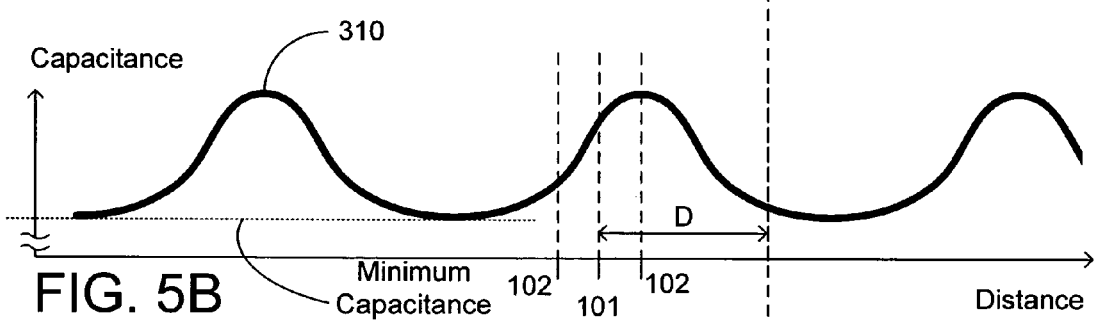
Figure 5C:
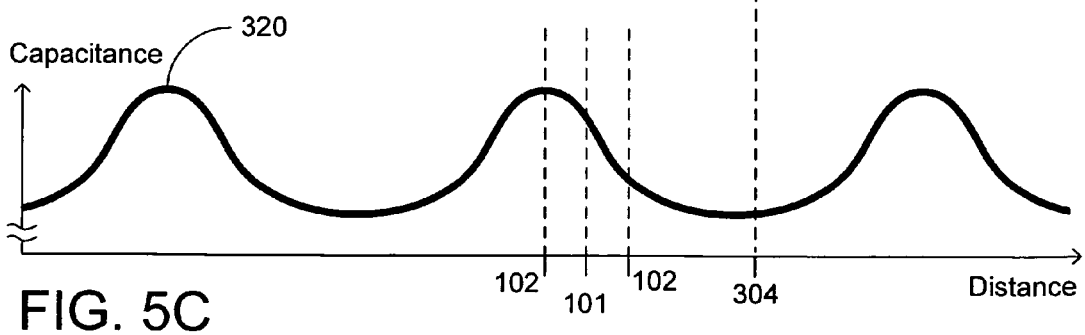

FIGS. 5B and 5C illustrate a capacitance produced between each respective plate 301 and 302 of the sensor 300 and the wall 99. FIG. 5B shows a capacitance curve 310 produced by the first plate 301 and the wall 99. FIG. 5C shows a capacitance curve 320 produced by the second plate 302 and the wall 99. Capacitance curves 310 and 320 are drawn relative to the centerline 304 of the sensor 300. Additionally, curves 310 and 320 show peaks when respective plates 301 and 302 are positioned over the centerline 101 of a stud 100 and show valleys when respective plates 301 and 302 are positioned between pairs of studs 100.

At points where a sensor 300 measures a minimum capacitance valve or a relatively low capacitance valve, a sensor 300 may be positioned far from any stud 100. The measured capacitance values increase as the sensor 300 nears the stud 100; however, the capacitance values of each plate 301 and 302 will differ if one of the plates is closer to the stud 100. For example, a first plate 301 may be close to or over an edge 102 of a stud 100. At the same time, the second plate 302 may still be positioned at a lateral distance away from the stud 100. In this case, the change in capacitance from its minimum value experienced by the first plate 301 will be greater than the change in capacitance experienced by the second plate 302.

In some embodiments, capacitance measurements are used to calculate a ratio. A first capacitance measurement represents the change in capacitance from a minimum value experienced on a first plate 301. A second capacitance measurement represents the change in capacitance from a minimum value experienced on a second plate 302. A ratio between the first and second capacitance measurements may be computed. If the ratio is approximately equal to a predetermined value, it may be determined that a centerline 304 of the sensor 300 is centered over an edge 102 of a stud 100. If the capacitance measurements are equal or the ratio is approximately equal to unity, both plates may be centered over the stud's edge 102 and the centerline 304 of the sensor 300 may be centered over the centerline 101 of the stud 100.

Figure 5D:
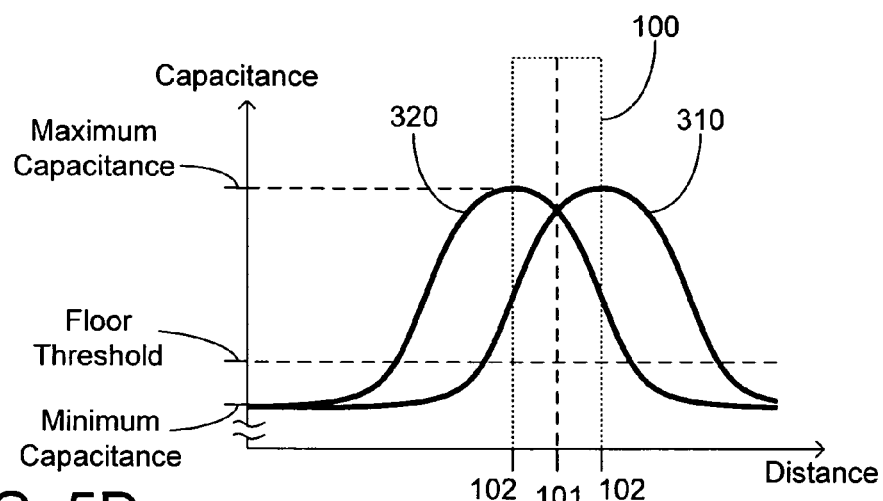

FIG. 5D shows overlapping first and second capacitance curves 310 and 320 relative to the centerline 304 of the sensor 300 and a stud 100. A point at which curves 310 and 320 intersect may indicate a position of the sensor 300 where each plate is encountering an equal capacitance; therefore, the centerline 304 of the sensor 300 may be directly over a centerline 101 of the stud 100. In some embodiments, at least one of the capacitance values must be above a floor threshold value, a value above a minimum capacitance value, before the capacitance measurements are compared with each other.

Figure 5E:
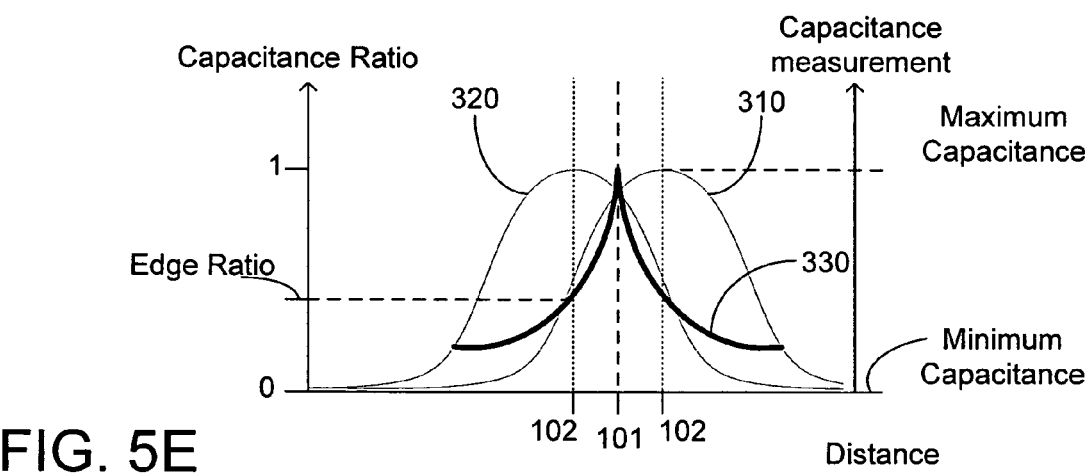
FIG. 5E shows a graph of a ratio of capacitance measurements of two primary plates versus a lateral distance between a sensor and an object, such as a hidden stud, in accordance with the present invention.

FIG. 5E shows a graph of a curve 330, which represents a ratio of capacitance measurements of two primary plates 301, 302 versus a lateral distance between a ratiometric capacitive sensor's centerline 304 and a centerline 101 of a stud 100, in accordance with the present invention. This ratio may be computed as the smaller capacitance divided by the larger capacitance, thereby resulting in a ratio that is equal to or less than one.

The calculated results, shown in a ratio curve 330, exhibits a sharp peak rather than a rounded top as previously seen in the single plate curves 210, 220, 230 and 240 of FIG. 3. The sharp peak of curve 330 allows a ratiometric sensor to locate a stud's features with increased accuracy unlike the sensors 200 and 200A of FIGS. 1A and 4A, which generate rounded peaked curves. In other words, the sharp point of the ratio curve 330 may be used to more precisely determine a centerline 101 of a stud 100.

Additionally, a transition ratio may be compared to the calculated ratio to determine the location of an edge 102 of a stud 100 as further described below. The transition ratio predicts a capacitance ratio formed at an edge of a stud when the sensor 300 is centered over the stud's edge for a particular wall structure. As such, a transition ratio may be used to indicate when the sensor 300 is centered over an edge 102.

A transition ratio may be determined in a number of ways. The transition ratio may be a factory set constant. Alternatively, the transition ratio may be set by an operator. In some embodiments, the transition ratio is calculated during operation.

In some embodiments, a transition ratio may be set during manufacturing. For example, a factory may set a transition ratio equal to a fixed value, e.g., 0.33. When plates produce capacitance measurements that form a ratio approximately equal to 0.33, the sensor 300 may indicate that the center of the sensor 300 is directly over an edge 102 of the stud 100.

In some embodiments, a transition ratio may be directly or indirectly selected by an operator of the sensor. For example, an operator may select a stud width and/or a wall thickness. The stud width and/or wall thickness may be used to select an appropriate transition ratio, for example, as shown in the table below.

| Stud Type | Wall Covering Thickness | Transition Ratio |
| --- | --- | --- |
| Double stud 76 mm (3 inches) | Single sheet 13 mm (½ an inch) | 0.32 |
| Single stud 38 mm (1½ inches) | Single sheet 13 mm (½ an inch) | 0.33 |
| Double stud 76 mm (3 inches) | Double sheet 25 mm (1 inch) | 0.35 |
| Single stud 38 mm (1½ inches) | Double sheet 25 mm (1 inch) | 0.45 |

In some embodiments, a transition ratio may be automatically determined by the sensor 300 based on capacitance measurements. A capacitance measurement may be a measure of a maximum capacitance measurement on a plate as shown in FIG. 3.

In some circumstances, the actual ratio of measured plate capacitances at the stud's edge 102 varies predictably with the wall thickness. Therefore, a maximum measured capacitance value may be used to set a transition ratio used to locate a stud's edge. This maximum value may indicate a wall covering's thickness, with thicker walls having smaller maximum values. The maximum value may also provide an indication of the width of the stud, with wider studs having larger maximum values. The measured capacitance values may also be compared to indicate a direction of a stud with the plate having a higher capacitance measurement indicating the direction of the center of the stud.

In some embodiments, the transition ratio may be calculated based on a historic maximum capacitance measurement. In other embodiments, a transition ratio may be calculated based on an instantaneous maximum capacitance measurement.

A historic maximum capacitance measurement may be determined over time as measured from either plate 301 or 302. A maximum capacitance measurement is expected when the plate 301 or 302 is centered over a stud. The maximum capacitance measurement may be saved in memory. As the capacitance changes over time, an updated maximum capacitance value may be stored.

Alternatively, an instantaneous maximum capacitance measurement may be used. An instantaneous maximum capacitance measurement may be selected each time the sensor 300 takes each pair of capacitance measurements from plates 301 and 302. In some embodiments, the larger of the two capacitance measurements may represent the maximum capacitance measurement. That is:

$$C_{max} = \max\{\text{FirstPlate Value, SecondPlate Value}\}.$$

In other embodiments, the maximum capacitance value may be determined by examining the capacitance formed by a single plate 301.

Using the maximum capacitance measurement, the sensor 300 may select a transition ratio from a table or compute a transition ratio from a formula. A sensor 300, having plates centered 38 mm (1½ inches) apart, with each plate 19 mm (¾ of an inch) wide, may use a transition ratio as shown in the table below. For example, a maximum capacitance measurement of 1.4, representing a double-width stud hidden behind a single sheet of sheetrock, may have a transition ratio of 0.32.

| Maximum Capacitance | Transition Ratio |
| --- | --- |
| 1.4 | 0.32 |
| 1.0 | 0.33 |
| 0.6 | 0.35 |
| 0.4 | 0.45 |

Alternatively, the sensor 300 may compute a transition ratio for each ratio calculation. In some embodiments, a transition ratio may be calculated as:

$$TR(P) = \begin{cases} 0.61 - 0.28 \dfrac{C_{max}}{P_{1/2}} & \text{if } C_{max} < P_{1/2} \\ 0.33 & \text{else} \end{cases}$$

where TR(P) is a Transition Ratio; $P_{1/2}$ is a design constant; and $C_{max}$ is a Maximum Capacitance. The design constant $P_{1/2}$ may be set during manufacturing and may represent the expected maximum capacitance measured over a reference wall structure having a single (nominal) stud having a width of 44 mm (1¾ inches) and a wall covering 99 having a thickness of 13 mm (½ of an inch). In some embodiments, the maximum capacitance $C_{max}$ parameter may be the historical maximum capacitance. In other embodiments, the maximum capacitance $C_{max}$ parameter may be the instantaneous maximum capacitance described above. The formula shows that if $C_{max}$ is less than the design constant $P_{1/2}$, the formula is used. If $C_{max}$ is greater than or equal to the design constant $P_{1/2}$, a fix value of 0.33 is used.

Once set, the transition ratio may be used to determine the location of an edge of a stud. A sensor 300 may measure a first capacitance value on a first plate 301 and a second capacitance value on a second plate 302. A capacitance ratio may be calculated between the first and second capacitance values. This capacitance ratio may be compared to the predicted transition ratio to determine whether the sensor is presently centered over an edge of a stud.

For example, a sensor 300 measuring a maximum capacitance value of 1.4 indicates the sensor has passed over a double-wide stud having a width of 76 mm (3 inches) hidden behind a single layer of sheetrock having a thickness of 13 mm (½ an inch). The transition ratio for this wall structure may be set to a value of 0.32. When the sensor 300 detects a position where the first and second capacitance measurements are approximately equal to 0.32, the sensor 300 may indicate that the sensor 300 is centered over an edge 102. In some embodiments, the stud's edge location may be determined to an accuracy of approximately 3 mm (⅛ of an inch) over a wall covering thickness range of 13 to 25 mm (½ to 1 inch).

A relative maximum capacitance value may be used to indicate the composition of a wall. For example, a specific design of a sensor 300 may measure a maximum capacitance value of 1.4, which indicates a double width stud hidden behind a single layer of sheetrock.

Measured capacitance values indicate a direction in which a stud 100 is located. At a stud's edge 102, one plate may be directly over the centerline 101 of the stud 100, while the other may be off to one side of the stud 100. The plate 301 or 302 positioned over the stud 100 will have a larger capacitance than the other plate 302 or 301 and will pass a maximum value as the sensor 300 is drawn across the stud 100. A plate 301 or 302 showing a larger capacitance indicates that the centerline 304 of the sensor 300 needs to be moved in the direction of that plate 301 or 302.

Figure 6A:
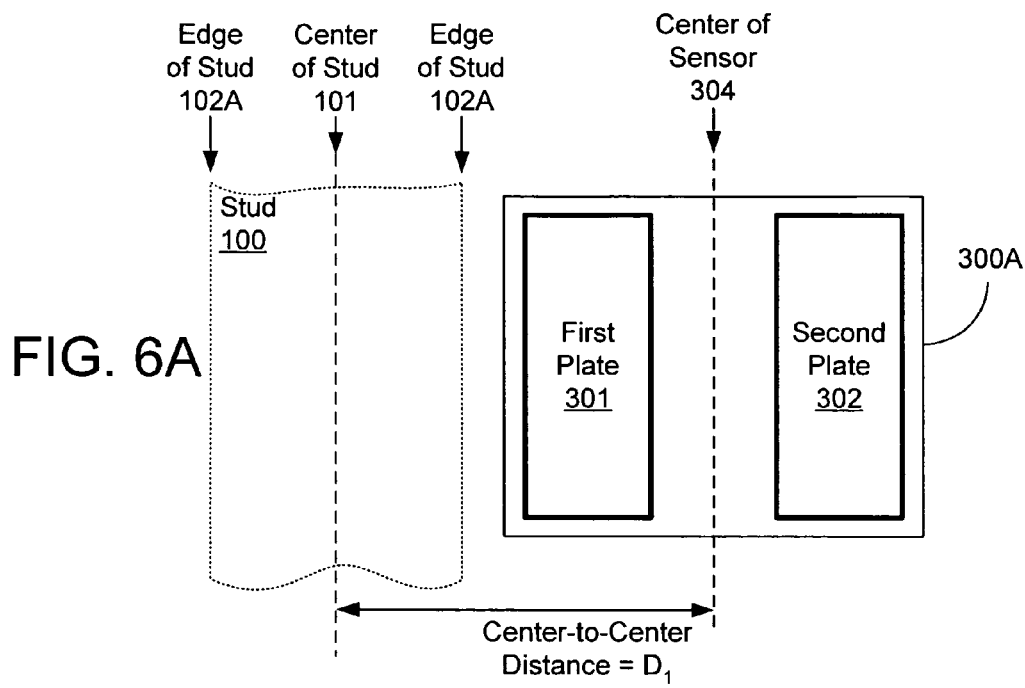
FIG. 6A illustrates plan views of a ratiometric capacitive sensor positioned at a lateral distance away from a hidden stud, in accordance with the present invention.
Figure 6B:
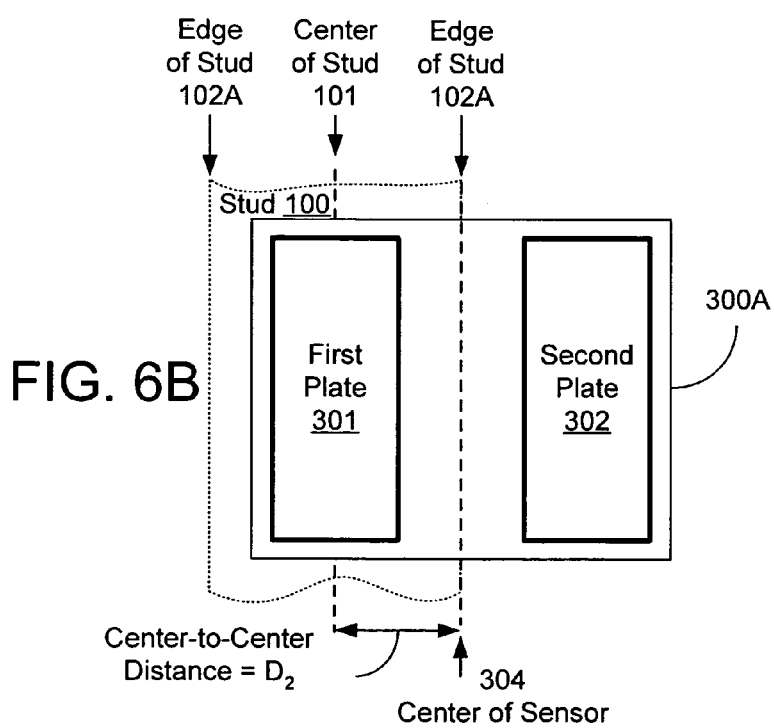
FIG. 6B illustrates a plan view of a ratiometric capacitive sensor centered on an edge of a hidden stud, in accordance with the present invention.
Figure 6C:
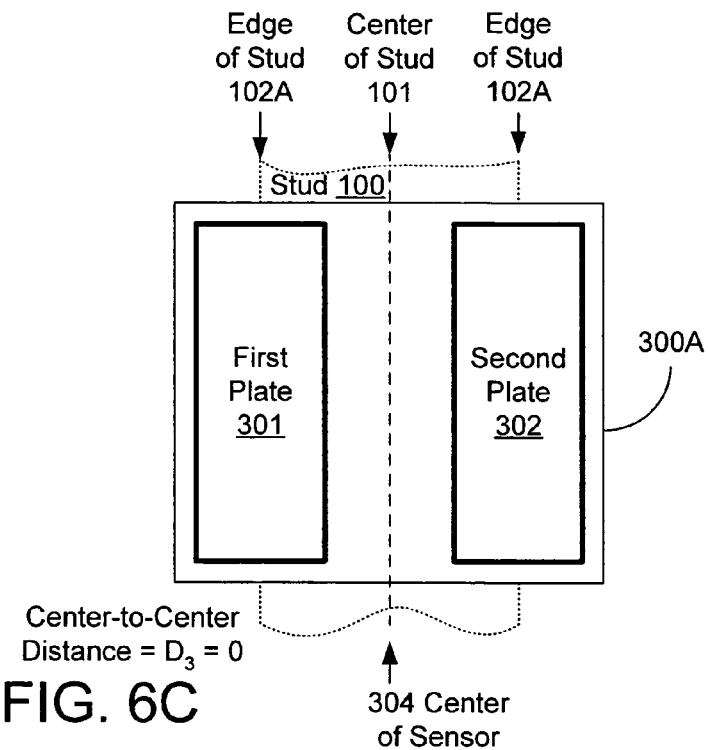
FIG. 6C illustrates a plan view of a ratiometric capacitive sensor centered on a centerline of a hidden stud, in accordance with the present invention.

FIGS. 6A–6C illustrate plan views of a ratiometric capacitive sensor 300A having two primary plates 301 and 302, in accordance with the present invention.

FIG. 6A shows a centerline 304 of a sensor 300A positioned at a distance of $D_1$ from a centerline 101 of a hidden stud 100. A plate 302 positioned at a substantial distance away from a stud 100 produces a near constant capacitance equal to some nominal or minimum value. As the sensor 300A, and consequently its plates 301, 302, is moved closer to the object, the capacitance of each plate 301, 302 will begin to increase. A sensor 300A may periodically monitor changes in capacitance of each plate 301, 302. As the capacitance changes from its nominal value, the sensor 300A may sense an approaching stud 100. A first plate 301 may near the stud 100 first; therefore its capacitance will be greater than the capacitance of the second plate 302, which may be farther away from the stud 100.

FIG. 6B illustrates a plan view of capacitive sensor 300A with the centerline 304 of the sensor 300A positioned directly over an edge 102A of a hidden stud 100 and positioned at a distance of $D_2$ from a centerline 101 of the stud 100. Some sensors 300A have lateral dimensions such that when the centerline 304 of the sensor 300A is positioned directly over an edge 102A of a hidden stud 100, the centerline of the first plate 301 is directly over the centerline 101 of the stud 100. In this situation, the capacitance of the first plate 301 is at its maximum value. Additionally, the ratio of the capacitances between the plates 301 and 302 may be equal to a predicable transition ratio. Therefore, a sensor 300A may identify the location of an edge 102A of stud 100 by calculating a ratio and determining whether the ratio equals this transition ratio. Additionally, since the first plate 301 has a capacitance greater than the second plate 302, the sensor 300A may provide an indication as to whether the stud 100 is to the right or left of the centerline 304 of the sensor 300A.

FIG. 6C illustrates a plan view of capacitive sensor 300A with the centerline 304 of the sensor 300A centered directly over a centerline 101 of a hidden stud 100, resulting in a center-to-center distance of $D_3=0$. In this position, each plate 301 and 302 may be partially over the stud 100. Each plate 301 and 302 will have a capacitance value that is some minimum threshold above its nominal values, below its maximum value, and approximately equal to a common value. Therefore, a centerline of a object may be located by identifying when two plates have capacitance values equal to a common value that is above some floor threshold value.

A floor threshold may be selected to be a value above a calibration capacitance measurement. The calibration capacitance measurement may be the minimum capacitance measured by the sensor 300. Setting the floor threshold value to a high value reduces the risk of false positive edge 102 and centerline 101 indications. Setting the floor threshold value to a low values allows a sensor 300 to detect narrower studs or to detect studs through thicker wall coverings.

Figure 6D:
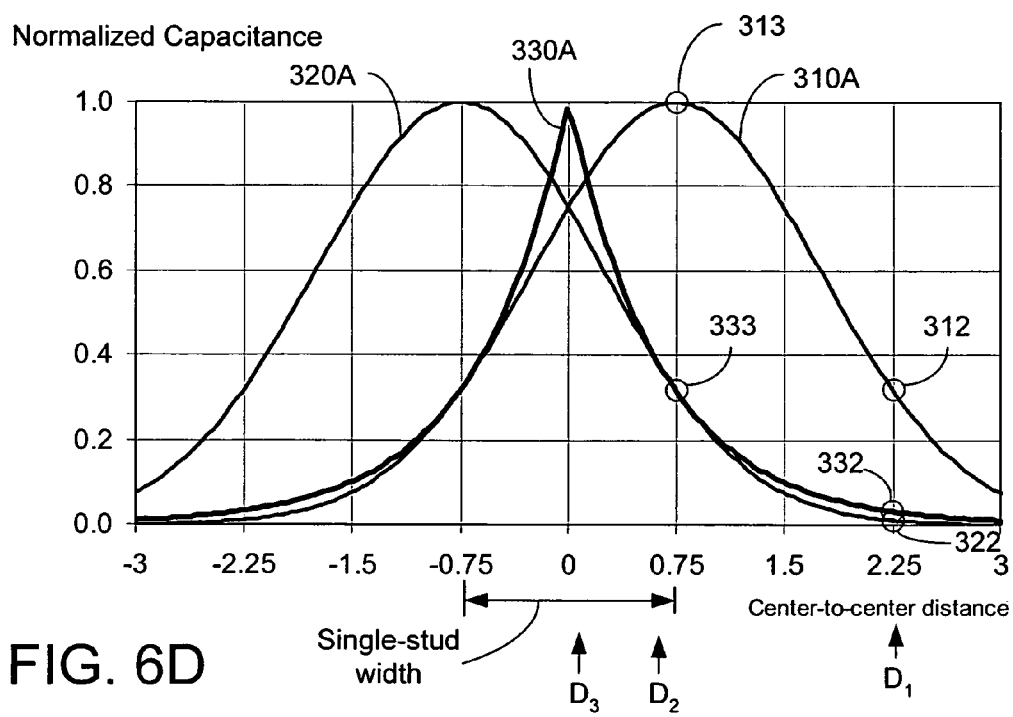
FIGS. 6D–6F show graphs of normalized capacitance measurements and a ratio versus distance for a hidden stud having a single, double and triple widths, respectively, in accordance with the present invention.
Figure 6E:
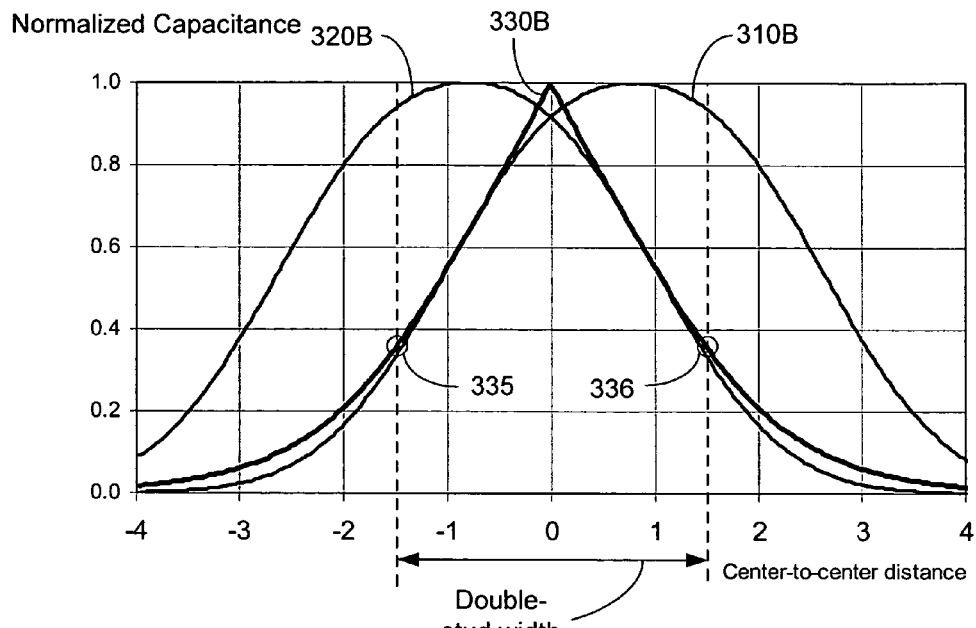
Figure 6F:
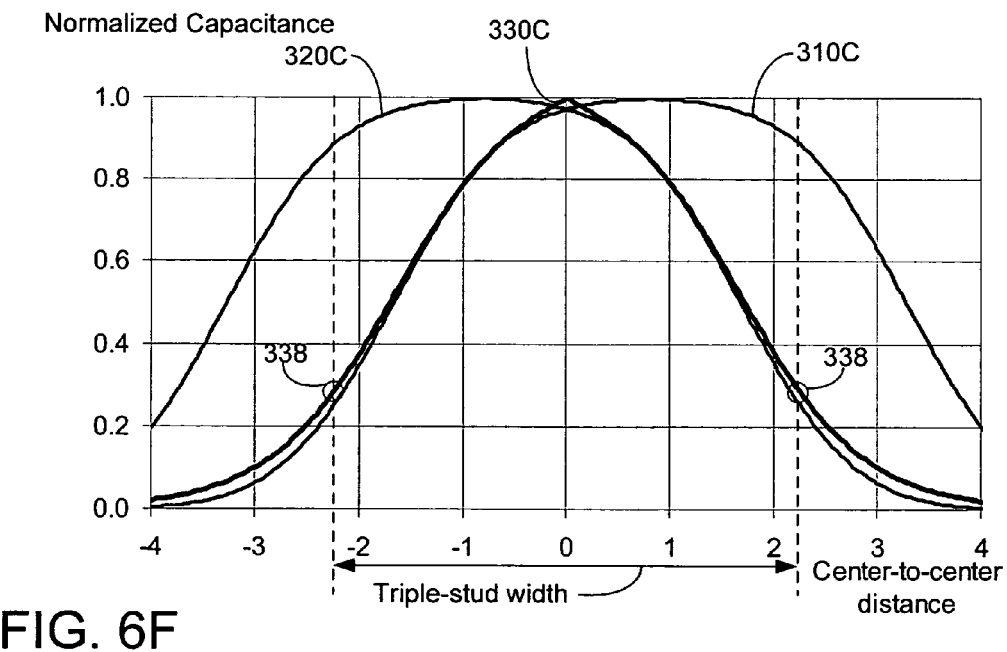

FIGS. 6D, 6E and 6F show graphs of capacitance measurements and a ratio versus distance for a hidden stud having single, double and triple widths, respectively, in accordance with the present invention.

A single-width stud may be approximately 38 mm (1½ inches) wide. A double-width stud may be approximately 76 mm (3 inches) wide. A triple-width stud may be approximately 114 mm (4½ inches) wide. The width of a capacitance curve increases as the width of a stud or group of studs increases. The ratio curve, however, remains a curve having a sharp peak, which may be used to locate a centerline of a stud.

FIG. 6D shows two plate capacitance curves 310A and 310B and a ratio curve 330A, in accordance with the present invention for FIG. 2A. The horizontal axis of the graph represents the distance between the centerline 304 of ratiometric capacitive sensor 300A and the centerline 101 of a single-width hidden stud 100. A first plate 301 is positioned at a distance from a stud 100 results in a change in capacitance shown by curve 310A. Similarly, a second plate 302 positioned at a distance from a stud 100 results in an equivalent but shifted change in capacitance as shown by the laterally offset curve 320A.

When a centerline 304 of sensor 300A is positioned at a distance $D=D_1$ from the centerline 101 of a stud 100 as shown in FIG. 6A, the first plate 301 exhibits a substantial change in capacitance but the second plate 302 only shows a substantially low change in capacitance as seen at points 312 and 322, respectively. Additionally, at the distance $D_1$, the ratio of the capacitance measurements is also substantially low, as shown on curve 330A at point 332.

At a distance $D=D_1$, the sensor 300A is not centered over a centerline 101 or edge 102 of the stud 100. The substantially low capacitance ratio shown at point 332 and the substantial change in capacitance detected in the first plate 301 shown at point 312 indicate a direction that an operator must move the sensor 300A in order to reach a centerline 101 or edge 102 of the stud 100. In other words, a plate having a higher capacitance indicates the direction of a centerline 101 of a stud 100 relative to the centerline 304 of the sensor 300A.

When sensor 300A is positioned at a distance $D=D_2$ from the centerline 101 of a stud 100 as shown in FIG. 6B, the first plate 301 detects a maximum capacitance and the second plate 302 detects a substantial change in capacitance, as seen at points 313 and 333, respectively. This combination of capacitance measurements results in a capacitance ratio approximately equal to a determined transition ratio.

When a sensor 300A calculates a capacitance ratio approximately equal to a predetermined transition ratio, the sensor 300A may indicate to an operator that the sensor 300A is centered over an edge 102 of the stud 100. Additionally, the sensor 300A may indicate to which side of the centerline 304 of the sensor 300A that the stud 100 is positioned.

When sensor 300A is centered at a distance $D=D_3=0$ over a stud 100 as shown in FIG. 6C, both plates 301 and 302 detect an approximately equal capacitance measurement. At the point where curves 310A and 320A intersect, their values are equal and the ratio curve 330A peaks at a maximum value of unity. Therefore, a unity ratio or a value approximately equal to unity may be used to identify the centerline 101 of a stud 100.

FIG. 6E graphs capacitance measurement curves 310B and 320B and a ratio curve 330B versus distance for a double-width hidden stud, in accordance with the present invention. Curves 310B and 320B represent a change in capacitance in plates 301 and 302, respectively, as sensor 300A passes over a double-width stud. Curve 330B represents the ratio of curves 310B and 320B. The peak of curve 330B locates a centerline of the double-width stud. An edge of the double-width stud may be located the position when the ratio curve 330B equals a predetermined transition ratio, as indicated by points 335 and 336.

FIG. 6F graphs capacitance measurement curves 310C and 320C and a ratio curve 330C versus distance for a triple-width hidden stud, in accordance with the present invention. Curves 310C and 320C represent a change in capacitance in plates 301 and 302, respectively, as sensor 300A passes over a triple-width stud. Curve 330C represents the ratio of curves 310C and 320C. The peak of curve 330C locates a centerline of the triple-width stud. An edge of the triple-width stud may be located when the ratio curve 330C equals a predetermined transition ratio, as indicated by points 337 and 338.

Curves 330A, 330B and 330C show a ratio of the capacitance curves. A ratio curve 330 may be computed as follows. When the first plate 301 produces a capacitance that is greater than the capacitance produced by the second plate 302, a ratio is calculated by dividing the second plate's change in capacitance value by the larger first plate's change in capacitance value. Similarly, when the first plate 301 produces a capacitance that is less than the capacitance produced by the second plate 302, the ratio is calculated by dividing the smaller first plate's change in capacitance value by the second plate's change in capacitance value. Formulaically, the ratio curve 330 may be computed by:

$$cap\_ratio(D) = \frac{\min\{FirstPlateValue(D), SecondPlateValue(D)\}}{\max\{FirstPlateValue(D), SecondPlateValue(D)\}}$$

where the plate value may be a change in value from a nominal value such as a nominal or minimal value determined during calibration. Theoretically, a plate value may be an absolute measurement of capacitance rather than a measurement of a change in capacitance. Practically, a plate value or capacitance measurement is a relative measurement from a value that may exclude parasitic capacitances of a sensor's circuitry and a wall covering. In some embodiments, a plate value is an indirect measure of capacitance. For example, the plate value may be a measure of a number of clock cycles necessary to charge a plate 301 or 302 to a reference level.

In some embodiments, the area between the first and second plates 301, 302 is occupied by side plates and/or circuitry. A set of plates 301, 302 positioned along side one another in a plane results in a non-conductive gap area between the plates 301, 302. The gap may be used for locating side plates 213 (FIG. 4A) or additional primary plates (see below with reference to FIGS. 8–10). Additionally, the gap may be used to position the associated electronic circuitry used to determine a capacitance value of each plate 301 and 302.

In some embodiments, the first and second plates 301, 302 are each approximately the width of one-half of a typical stud and their centers are positioned approximately the width of one typical stud apart, thereby leaving another one-half width of a stud as a gap between the plates 301, 302.

In some embodiments of the present invention, a first plate 301 and a second plate 302 have similar or equal dimensions. In some embodiments, each plate has the same the width. For example, plates 301 and 302 may each have a width equal to 19 mm (¾ of an inch). Greater plate widths advantageously increase the plate's capacitance, however, it may also decrease certainty in locating centerline and edge features of an object or a discontinuity. Similarly, the separation of the plates 301 and 302 may also affect the accuracy of location an object or a discontinuity having particular width.

In some embodiments, each plate has the same the height. For example, plates 301 and 302 may each have a height of 51 mm (2 inches). Plates having a longer plate height advantageously increase the plate's capacitance, thereby increasing a sensor's accuracy in more precisely locating centerline and edge features of an object or a discontinuity. A plate's height, however, may be limited by a desired physical size of a sensor's housing.

In some embodiments of the present invention, a first plate 301 and a second plate 302 are positioned in sensor 300 such that their center-to-center spacing is a distance equal to the width of a typical object or discontinuity. For example, the width of a single 2-by-4 stud may be approximately 38 to 44 mm (1½ to 1¾ inches), (the actual stud width). Therefore, a sensor may be designed to having a center-to-center spacing of plates 302, 303 of 44 mm (1¾ inches).

In some embodiments of the present invention, a first plate 301 and a second plate 302, each having dimensions of 51 mm (2 inches) by 19 mm (¾ of an inch), are separated by a gap of 19 mm (¾ of an inch) resulting in a pair of plates 301 and 302 that have a center-to-center spacing of 44 mm (1¾ inches).

Figure 7:
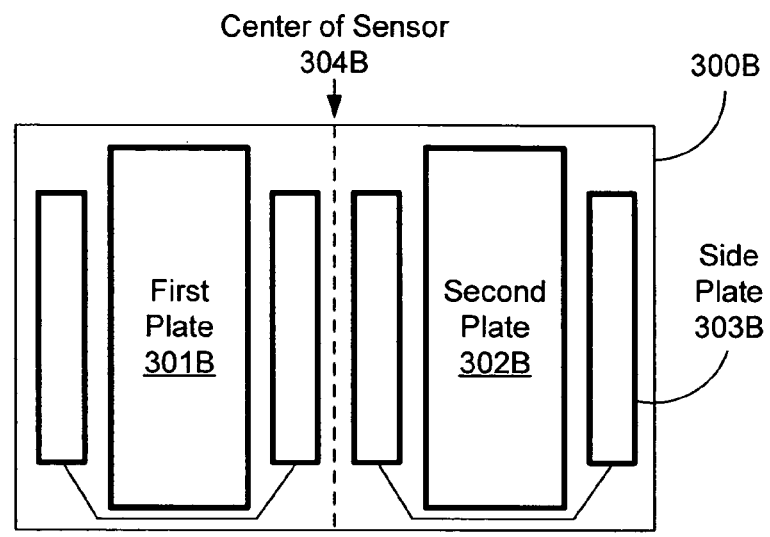
FIG. 7 illustrates a plan view of a ratiometric capacitive sensor having two primary plates and side plates, in accordance with the present invention.

FIG. 7 illustrates a plan view of an alternate embodiment of a ratiometric capacitive sensor 300B, in accordance with the present invention. The sensor 300B includes two primary plates 301 and 302 each having a set of side plates 213. A pair of side plates 213 straddling a primary plate 301 and 302 results in a capacitance curve having steeper slopes as previously shown with reference to FIGS. 4A and 4B. A resulting ratio curve would have slight steeper slopes as well, thereby providing a sharper point for locating a centerline 101 of a stud 100.

Figure 8:
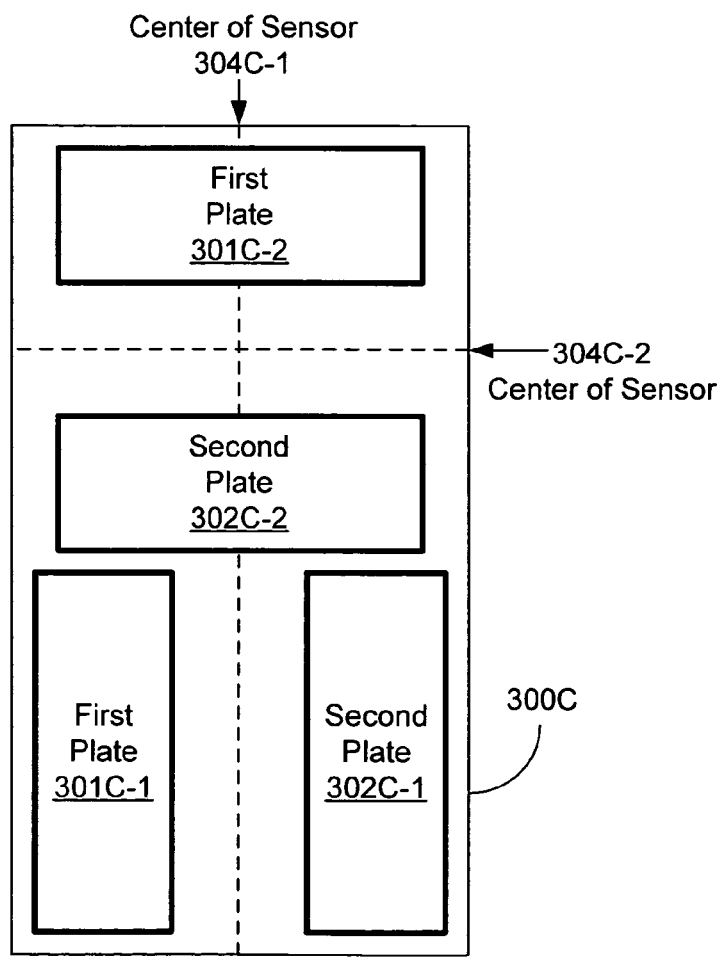
FIG. 8 illustrates a plan view of a capacitive sensor having two pairs of orthogonally oriented primary plates, in accordance with the present invention.

FIG. 8 illustrates a plan view of a capacitive sensor 300C having two pairs of orthogonally oriented primary plates 301C-1, 302C-1, 301C-2 and 302C-2. A first pair of plates 301C-1 and 302C-2 may be used to find a vertically oriented stud. A second pair of plates 301C-2 and 302C-2 may used to find a horizontally oriented stud.

FIG. 9 illustrates a plan view of a capacitive sensor 300D having a series of three or more plates, for example, Plates A–G. When the plates are placed against a wall and activated, the series of plates may be calibrated. While some plates may be located partially over or completely over a stud, other plates may be at a substantial lateral distance away from the studs. As such, plates that exhibit the lowest capacitance may be used to define the nominal capacitance value. After calibration, which may entail sliding the series of plates across the wall, these plates may be used to indicate the location of a void behind a walled surface. The nominal capacitance value may also be used as a reference. The nominal value may be used to determine whether other plates are positioned near, partially over or completely over a stud. In some embodiments, a sensor 300D may be able to detect one or more studs located behind the wall without moving the sensor 300D across the wall.

A series of three or more plates has a further advantage that objects or discontinuities of various widths may be measured. Additionally, the series of plates A–G may be integrated with other equipment. For example, a horizontal series of plates may be fixed in the back of a level. The level may be placed against a wall and activated. A series of LED may be used to indicate the location of studs or other objects or discontinuities such as metal pipes and electrical wires.

Alternatively, a series of plates may be positioned over moving objects, such as over a conveyor belt. The plates A–G may be used to detect a passing object and may be used to identify the centerline of the passing object.

FIG. 10 illustrates a plan view of a capacitive sensor 300E having an array of primary plates 11–34, in accordance with the present invention. An array of plates may have two or more columns and two or more rows of plates. Each plate 11–34 may be individually charged separately or in concert with a subset of other plates to determine a capacitance measurement. Ratios between various pairs of capacitance measurements may be taken to identify features of a hidden structure.

FIG. 11 illustrates a plan view of a capacitive sensor 300F having two primary plates 301 and 302 and associated signal processing circuitry 400 positioned in the gap between the two primary plates 301 and 302, in accordance with the present invention. Each plate 301 and 302 may be conventionally electrically connected to the circuitry 400 with a conductor, such as an etched conductor on a PC board.

FIG. 12 shows a block diagram of a ratiometric capacitive sensor having two primary plates 301 and 302 and associated circuitry 400A, in accordance with the present invention. In some embodiments, a sensor includes a first plate 301, a second plate 302 and electronic circuitry 400A having a first measurement circuit 410A, a second measurement circuit 410B, a comparison circuit 414, and an indicator 416. The first and second plates 301 and 302 are conventionally charged and discharged by the respective first and second measurement circuits 410A, 410B. Each measurement circuit 410A, 410B provides a capacitance measurement to the comparison circuit 414. The capacitance measurement may be an indication of a change in capacitance from a nominal capacitance experienced during calibration. The comparison circuit 414 processes the capacitance measurements. For example, the comparison circuit 414 may compute a ratio between the capacitive measurements. The comparison circuit 414 may determine whether the capacitive measurements are within a predetermined value of each other. The comparison circuit 414 then provides a signal to the indicator 416. The indicator 416 may be used to alert the operator of information regarding an object, such as a stud.

The comparison circuit 414 (e.g., a comparator) may compare and/or process the capacitance measurements to determine whether an object or a discontinuity is present and/or whether a feature of an object or a discontinuity is detected. For example, comparison circuit 414 may determine that the sensor 300 is centered over a stud 100 by detecting that the capacitance measurements are equal to each other and also above a floor threshold. Capacitance measurements may be considered equal when they are within a predetermined percentage value or absolute value from each other. Comparison circuit 414 may determine that the sensor is centered over an edge 102 of a stud 100 by detecting that the capacitance measurements form a ratio that is equal to a transition ratio. The transition ratio may be a fixed value, a value indirectly or directly selected by a user, a value extracted from a lookup table or a computed value. A capacitance ratio may be considered equal to the transition ratio when the capacitance ratio falls within range of values about the transition ratio.

In some embodiments, the comparison circuit 414 couples capacitance measurement to the indicator 416. The indicator 416 may visually (or audibly) display a value indicative of each capacitance value. The operator may use the displayed values to visually determine whether an object or a discontinuity exists, for example, by looking for changing capacitive measurements. Additionally, an operator may use the displayed values to visually determine the location of edges 102 and centerlines 101 of studs 100, for example, by looking for capacitance measurements equaling a transition ratio.

FIG. 13 shows another version of a sensor of FIG. 11 having two primary plates 301 and 302 and circuitry 400B. The sensor includes a first plate 301, a second plate 302 and electronic circuitry 400B having a first measurement circuit 420A, a second measurement circuit 420B, a properly programmed microcomputer or a microcontroller 424, and an indicator 426. Here microcontroller 424 carries out the comparator functions of comparison circuit 414 of FIG. 12.

The first and second plates 301 and 302 are charged and discharged by the respective first and second measurement circuits 420A, 420B. Each measurement 402A, 402B circuit provides a capacitance measurement to the microcontroller 424. Additionally, the microcontroller 424 may provide timing or other control signals to the first and second measurement circuits 420A and 420B. The microcontroller 424 processes the capacitance measurements and may provide a signal to the indicator 426. The indicator 416 may include a display, such as a liquid crystal display and/or LEDs, and may include an audio device, such as a speaker or buzzer.

Figure 14:
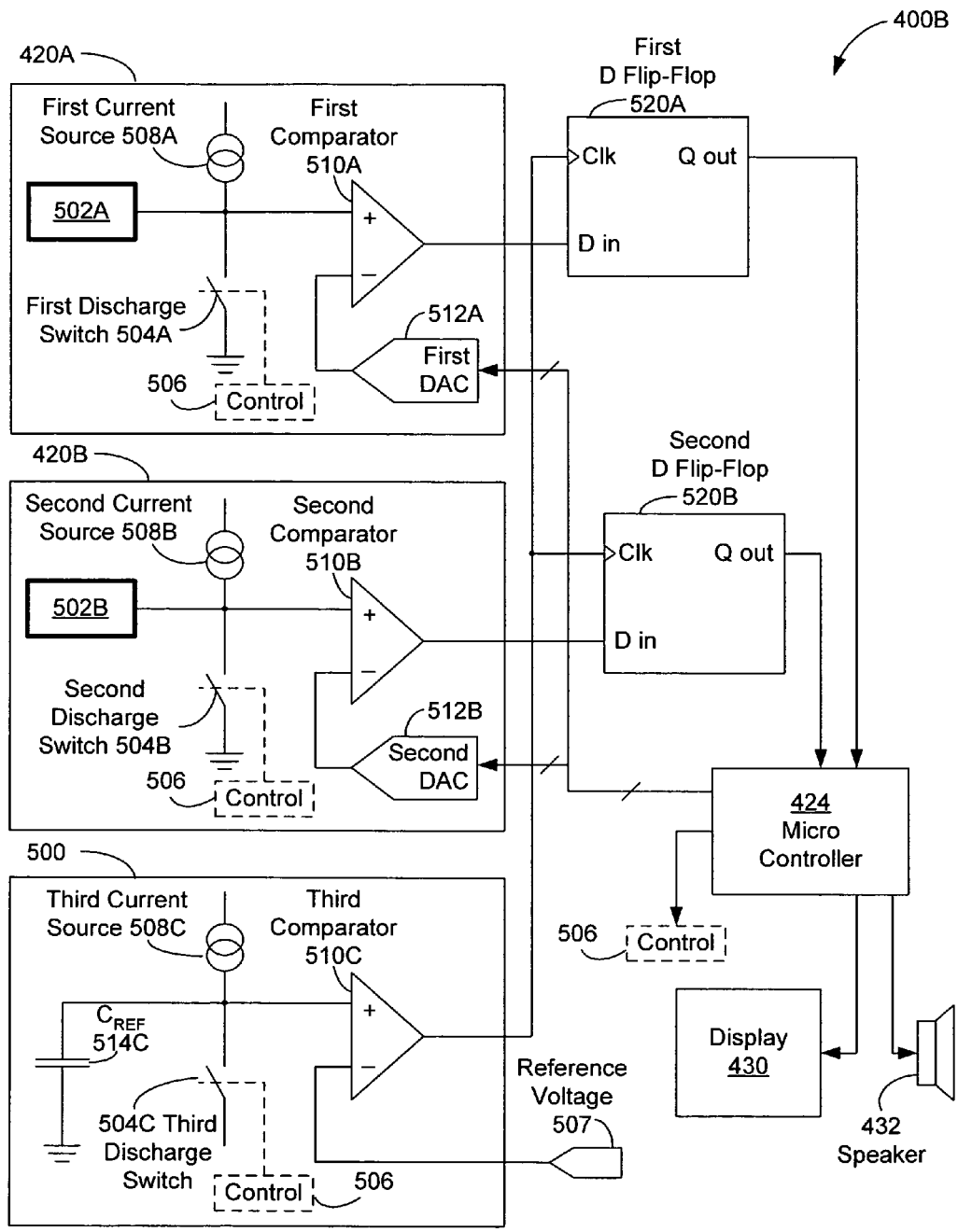
FIG. 14 shows a block diagram of ratiometric circuitry, in accordance with the present invention.

FIG. 14 shows a block diagram of circuitry 400B of a ratiometric capacitive sensor of FIG. 13. Circuitry 400B includes a first measurement circuit 420A and a second measurement circuit 420B. The measurement circuits 420A, 420B may be used to measure relative charging times of the first and second capacitors formed by the plates 301 and 302. In some embodiments, circuitry 400B also includes reference circuit 500 having a reference capacitor $C_{REF}$ 514C, which may be used to form a third capacitance and to which charge times of plates 301 and 302 may be compared.

The first measurement circuit 420A and the second measurement circuit 420B may be similarly constructed. A measurement circuit 420A/B may include an electrical connection 502A/B to a respective plate 302, 303 (not shown in FIG. 14). A respective plate 301 or 302 may be connected, by way of a connection 502A/B, to a current source 508A/B, a discharge switch 504A/B, and a first input signal to a comparator 510A/B. A second input signal to the comparator 510A/B may be provided by an output of a digital-to-analog converter ("DAC") 512A/B having an input that may be independently set and changed by a microcontroller 424.

An output signal of the comparator 510A may be provided as a data input to a first delay flip-flop ("D flip-flop") 520A. An output signal of the comparator 510B may be provided as a data input to a second D flip-flop 520B.

The reference capacitor $C_{REF}$ 514C may be connected to a third current source 508C, a third discharge switch 504C and a first input to a third comparator 510C. A second voltage input to the third comparator 510C may provided by, for example, a voltage source preset during factory calibration. An output of the third comparator 510C may be provided as a clock signal input to the first and second D flip-flops 520A, 520B. The Q-output of each D flip-flop 520A, 520B may be provided as an input to the microcontroller 424.

The microcontroller 424 may be programmed conventionally as described herein to control the operation of a measurement circuit 420A, 420B, 500. For example, the microcontroller 424 may set a signal on control line 506 that simultaneously turns the discharge switches 504A, 504B, 504C on and off. The microcontroller 424 may also be used to set the values provided to the DACs 512A, 512B and to process the Q-output of each D flip-flop 520A, 520B. As a result, the microcontroller 424 may provide as an output signal(s) an indication of a location of a sensed edge and/or sensed centerline of a hidden object such as stud and joist. The indication may be provided to the user visually and/or audibly, for example, by a display 430, a speaker 432, and/or the like. Additionally, the display may indicate a relative direction of the hidden object.

In some embodiments, calibration of a ratiometric stud sensor is performed by placing the sensor 300 having plates 301 and 302 on a wall and turning the power on thereto (conventionally from a battery, not shown). The sensor then charges and discharges each plate to determine a value for each DAC that will cause the comparators to trigger simultaneously with the comparator in the reference circuitry. These DAC values become a calibrated reference point against which a change in capacity may be determined.

As the sensor 300 is moved toward and over a stud 100, each DAC value is continuously updated to maintain simultaneous triggering of the comparators with the triggering of the comparator in the reference circuitry 500. The change of each DAC value from its calibration reference point is a measure of the change in capacitance sensed by that plate. The change in the DAC value may be used as a capacitance measurement.

Dividing the smaller of the two capacitance measurements by the larger gives an updated capacitance ratio. The centerline of a stud may be determined when the capacitance ratio is equal to unity. A capacitance ratio equaling a particular transition ratio, whose precise value depends on the plate configuration, occurs at the stud edge. The microcontroller 424 can then activate an appropriate display 430, 432 to indicate the desired characteristics of the stud.

Figure 15:
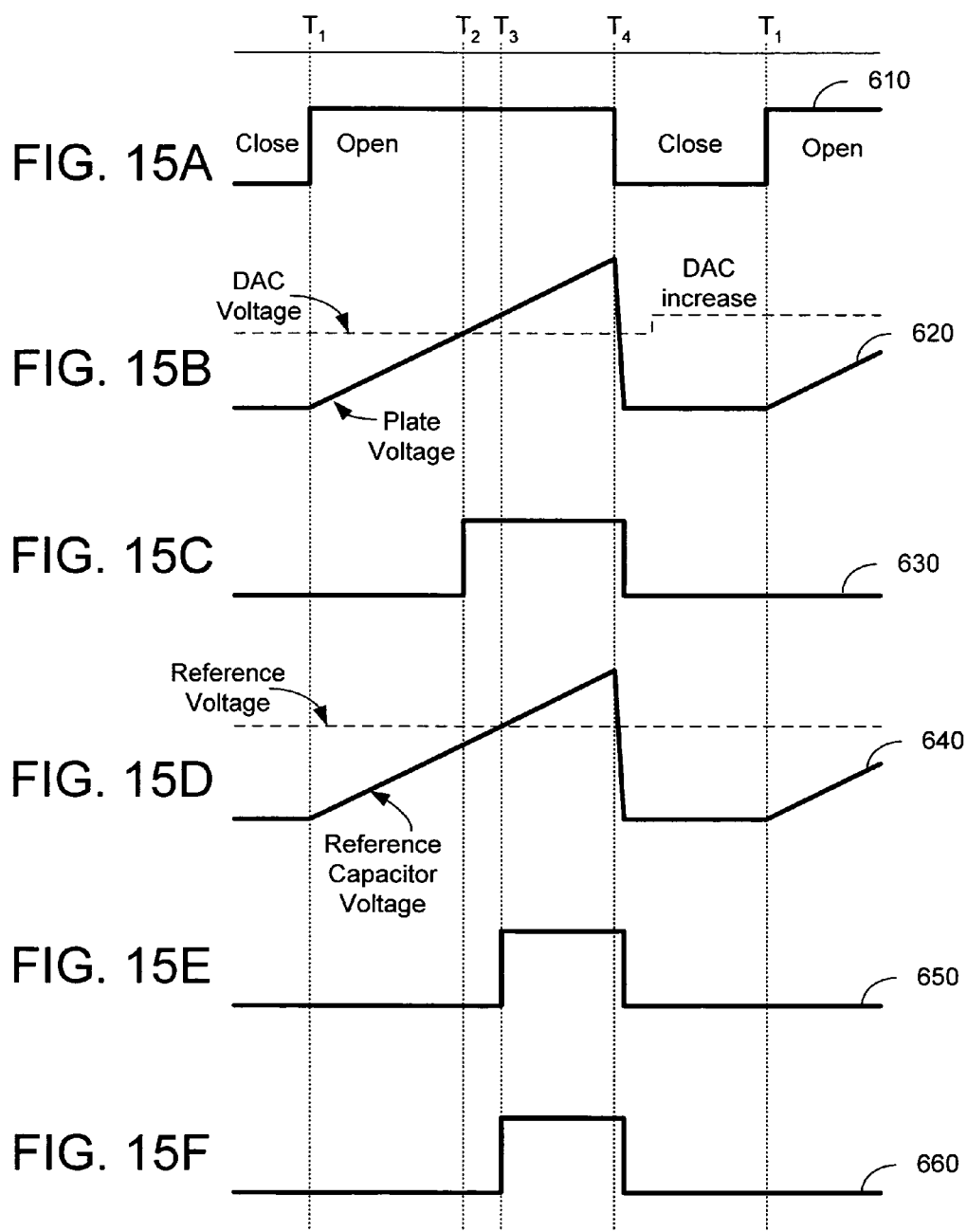
FIGS. 15A–F show timing diagrams of circuitry increasing a DAC voltage, in accordance with the present invention.

FIGS. 15A–F show timing diagrams of circuitry 400B increasing a DAC voltage. FIG. 15A shows a waveform 610 representing a control voltage 506 across discharge switch 504A. FIG. 15B shows a waveform 620 representing a voltage on capacitive plate 302. FIG. 15C shows a waveform 630 representing an output of a comparator 510A. FIG. 15D shows a waveform 640 representing a voltage on reference capacitor 514C. FIG. 15E shows a waveform 650 representing an output of a reference comparator 510C. FIG. 15F shows a waveform 660 representing an output of flip-flop 520A. In this sequence of figures, a first comparator 510A of circuit 420A triggers at a time $T_2$ in curve 650 before the triggering at time $T_3$ in curve 650 of a third comparator 510C of reference circuit 500.

FIG. 15A shows in curve 610 the timing of a control signal 506, which may be used to simultaneously close and open discharge switches, namely first, second and third discharge switches 502A–C. At time $T_1$, the control signal 506 opens the discharge switches 502A–C, thereby allowing the plates 301 and 302 and capacitor 514C to charge. At time $T_4$, control signal closes 506 the discharge switches 502A–C, thereby discharging the plates 301 and 302 and capacitor 514C. In some embodiments, the control signal 506 is provided by a microcontroller 424.

FIG. 15B shows in curve 620 representing input voltages supplied to a first comparator 510A. A first input signal is provided as a voltage level from a first plate 301. A second input is provided as a steady voltage level supplied by a first DAC 512A. The capacitor voltage of the first plate 301 changes as it charges and discharges.

When switch 504A/B is closed by control signal 506, the plate voltage is held at a value of zero volts. Upon opening the switches 504A, 504B, 504C, current sources 508A–C charge each plate 301 and 302 and the reference capacitor 514C in the reference circuit 500. Assuming all current sources 508A–C are identical, each plate 301 and 302 and the reference capacitor 514C is charged at a rate inversely proportional to its capacity, or more specifically at a rate following dV/dt=I/C. When a plate voltage equals the voltage on the second input of the comparator 510A/B/C, the comparator output will change states. If the reference comparator 510C triggers first, the D flip-flop 520A/B output will be a logical zero, while if a plate comparator 510A/B changes state first, the output of that D flip-flop 520A/B will be a logical one.

Before time $T_1$, the capacitor voltage is at a known level, namely zero volts. Between times $T_1$ and $T_4$, the capacitors are allowed to charge. As some point, namely time $T_2$, the increasing voltage level of the capacitor equals the steady voltage level provided by the first DAC 512A. At this point, the comparator 510A changes states, thereby providing a logical one to a D input of a first D flip-flop 520A.

FIG. 15C shows in curve 630 the output signal of the first comparator 510A, which is provided as the D input signal to a first D flip-flop 520A.

FIG. 15D shows in curve 640 representing input voltages supplied to a third comparator 510C. A first input signal is provided as a variable voltage level across a reference capacitor 514C. A second input is provided as a steady voltage level supplied by reference voltage source 507. The voltage across the reference capacitor 514C changes as it charges and discharges. Before time $T_1$, the capacitor voltage is at a known level, namely zero volts. Between times $T_1$ and $T_4$, the reference capacitor 514C is allowed to charge. As some point, namely time $T_3$, the increasing voltage level of the reference capacitor 514C equals the steady voltage level provided by the reference voltage source 507. At this point, the comparator 510C changes states, thereby providing a logical one to a clock input of a first D flip-flop 520A.

FIG. 15E shows in curve 650 the output signal of the third comparator 510C, which is provided as the clock input of the first D flip-flop 520A.

FIG. 15F shows in curve 650 a Q-output signal of the first D flip-flop 520A. Once the clock signal provided by the reference circuit 500 triggers the first D flip-flop 520A, the Q-output signal represents a sample and hold of the logical value supplied at the D input. Since the first comparator 510A triggered before the reference circuit 500, the voltage supplied by the first DAC 512A is too low and may be increase. For example, the microcontroller 424 may detect the logical one provided by the D flip-flop 520A and determine that the voltage provided by the first DAC 512A should be increased by some amount before the next charging sequence as shown in FIG. 15B.

FIGS. 16A–F show timing diagrams of circuitry 400B decreasing a DAC voltage. In this sequence of figures, the third comparator 510C triggers time $T_3$, which occurs before the first comparator 510A triggers at time $T_2$.

Figure 16:
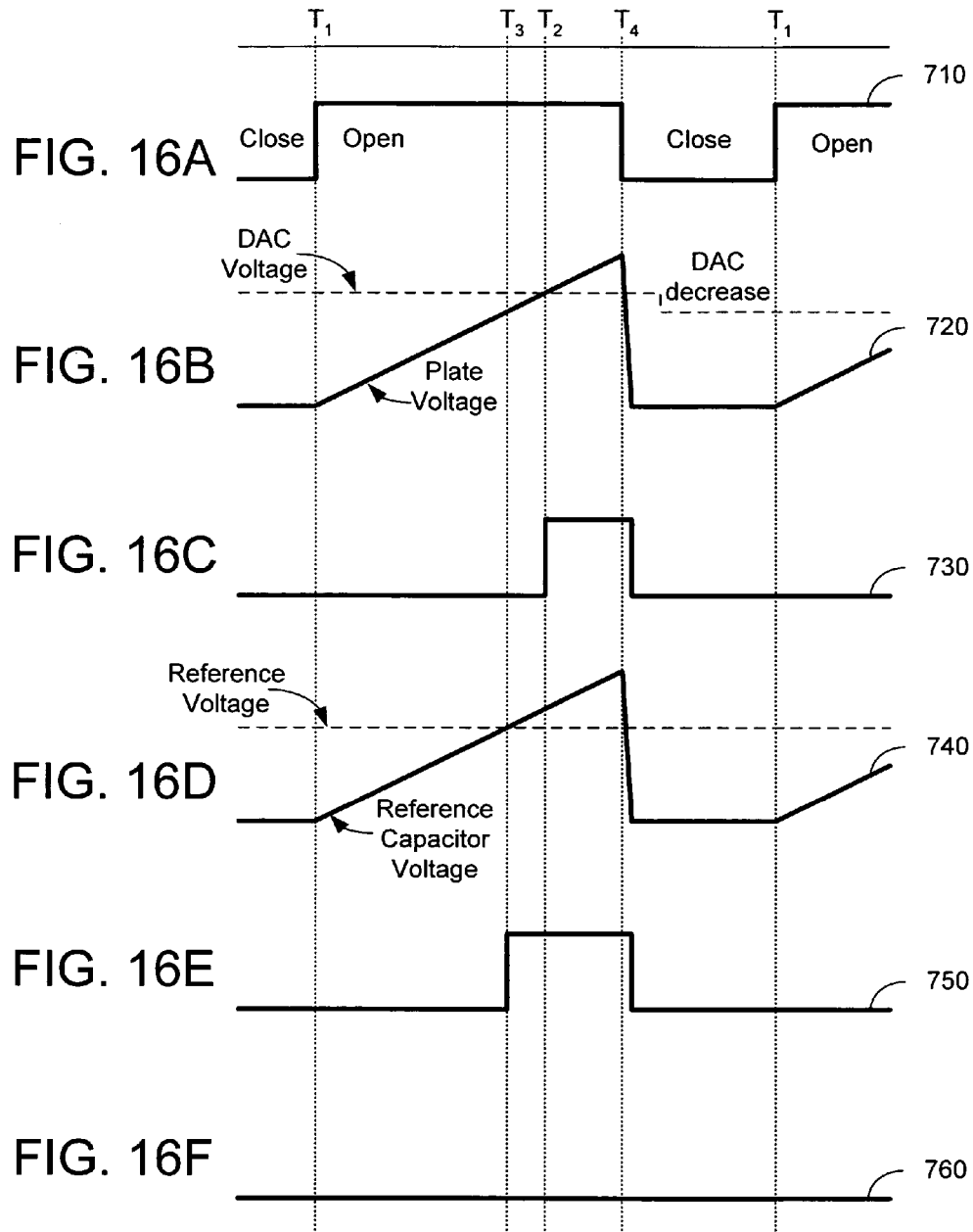
FIGS. 16A–F show timing diagrams of circuitry decreasing a DAC voltage, in accordance with the present invention.

FIG. 16A shows in curve 710 the timing of a control signal 506, which may be used to simultaneously close and open discharge switches, namely first, second and third discharge switches 502A–C. At time $T_1$, the control signal 506 opens the discharge switches 502A–C, thereby allowing the capacitors to charge.

FIG. 16B shows in curve 720 input voltages supplied to the first comparator 510A. As some point, namely time $T_2$, the increasing voltage level of the capacitor formed by plate 301 equals the steady voltage level provided by the first DAC 512A. At this point, the comparator 510A changes states from a logical zero to a logical one.

FIG. 16C shows in curve 730 the output of the first comparator 510A, which is provided as the D input of the first D flip-flop 520A.

FIG. 16D shows in curve 740 input voltages supplied to the third comparator 510C. Between times $T_1$ and $T_4$, the reference capacitor 514C is allowed to charge. As some point, namely time $T_3$, the increasing voltage level of the reference capacitor 514C equals the steady voltage level provided by the reference voltage source 507. At this point, the comparator 510C changes states, thereby providing a logical one to a clock input of the first D flip-flop 520A.

FIG. 16E shows in curve 750 the output of the third comparator 510C, which is provided as the clock input of the first D flip-flop 520A.

In the case shown in FIGS. 16A–F, the reference circuit 500 triggered at time $T_3$, which occurs before the first circuit 420A triggered at time $T_2$. Therefore, the clock signal triggers the D flip-flop 520A before the output of the first comparator 510A is provided to the D input of the D flip-flop 520A. This timing results in the Q-output signal to remain at a logical zero, as shown in curve 760 of FIG. 15F.

Since the first comparator 510A triggered after the reference circuit 500, the voltage supplied by the first DAC 512A may be too high and may be decrease. For example, the microcontroller 424 may detect the logical zero provided by the D flip-flop 520A and determine that the voltage provided by the first DAC 512A should be decreased by some amount before the next charging sequence as shown in FIG. 16B.

Eventually, the DAC voltage be increased or decrease to a value that will cause the first circuit 420A to trigger at approximately the same time as the reference circuit 500. During initialization, a DAC value that causes the circuits 420A, 500 to trigger at the same time may be used as a predetermined DAC value that represents an initial capacitance of the first plate 301. The predetermined DAC value may represent the capacitance of a wall without a stud. After initialization, a DAC value that causes the circuits 420A, 500 to trigger at the same time may.

The second plate 302 may be charged and discharged and a second DAC value may be determined in a fashion equivalent to the process used with reference to the first circuit 420A describe above. The first and second circuits 420A, 420B may operate by a same control signal to generate independent capacitance measurements.

In operation, each time the discharge switches 504A–C are opened, outputs from the D flip-flops 502A, 502B will eventually be updated. The microprocessor 424 may use this information to increase or decrease the input to the corresponding DAC 512A/B, which in turn, increases or decreases the time it takes for the plate comparator 510A/B to trigger. The sensor may operate as a closed loop feedback system that maintains the time to trigger for each plate equal to that of the reference channel. An eventual value of a DAC 512A/B may be directly related to a plate capacitance or a change in plate capacitance.

The two independent capacitance measurements may be in a form of a change in first and second DAC values from their calibration values. The sensed first DAC value may be used along with the sense second DAC value to determine the presents and features of an object or a discontinuity, such as the centerline 101 and edges 102 of a stud 100.

Figure 17:
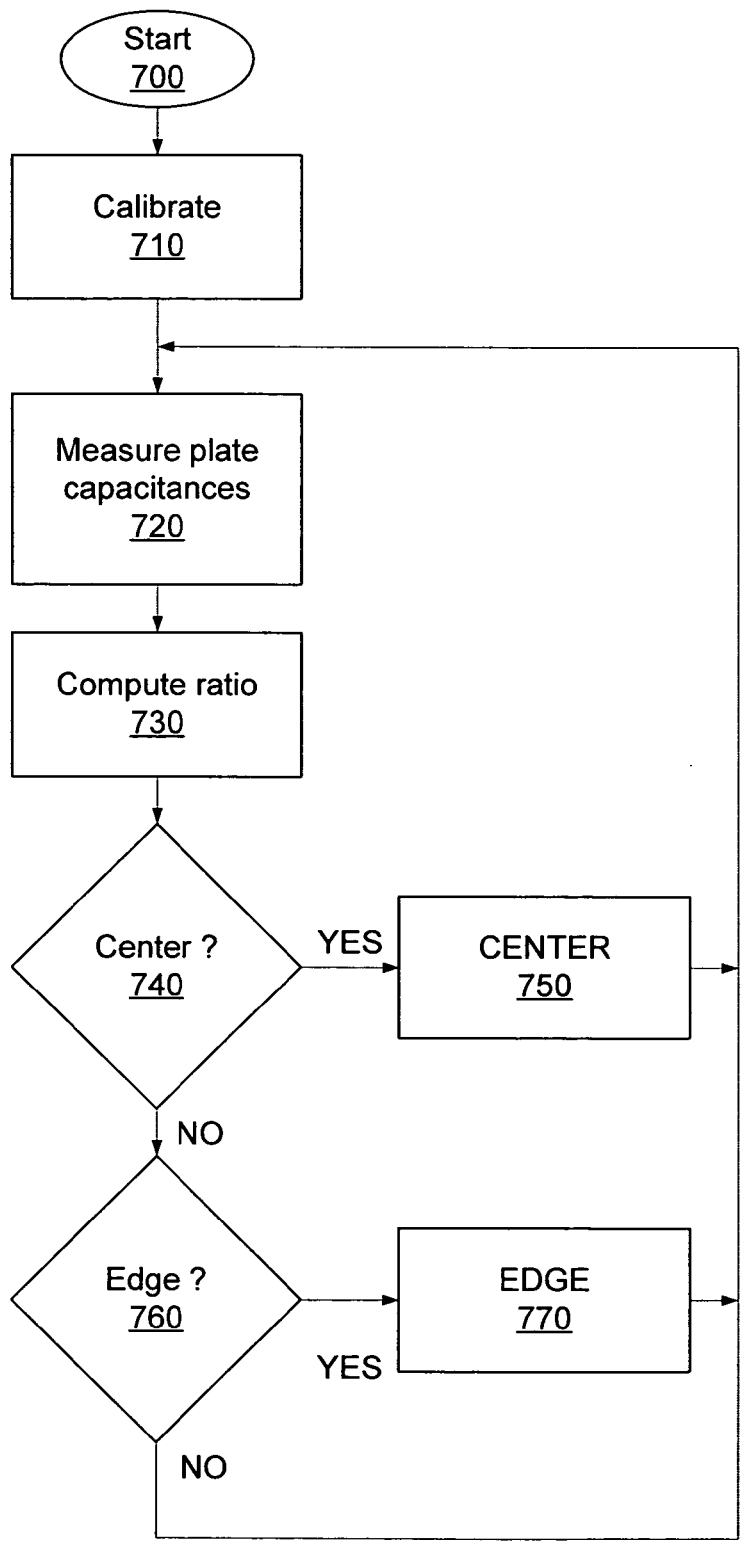
FIGS. 17–19 illustrate a process to detect a centerline and edges of an object, such as a stud, in accordance with the present invention.
Figure 18:
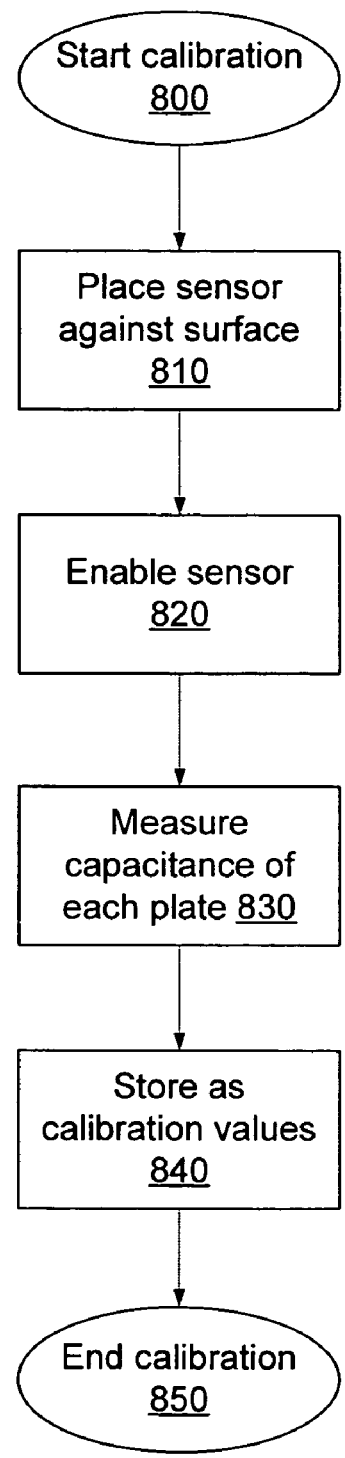
Figure 19:
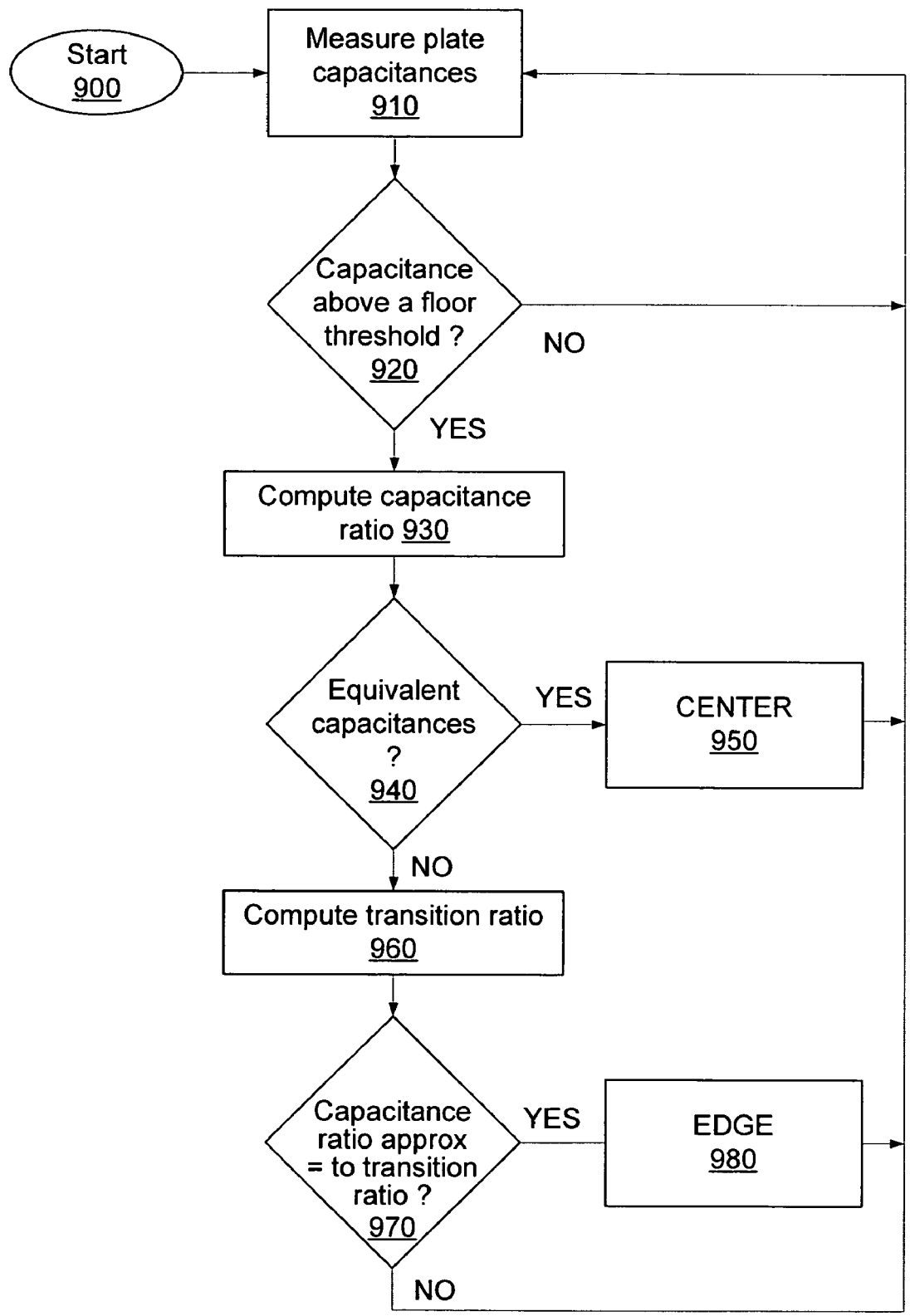

FIGS. 17–19 illustrate a process to detect a centerline 101 and edges 102 of an object or a discontinuity, such as a stud 100, for example, as may be carried out by micro controller 424 or comparison circuit 414. The order of steps presented may be rearranged by those skilled in the art.

FIG. 17 illustrates a top level flow of processing of sensor 300, in accordance with some embodiments of the present invention as carried out by the program executed by processor 424. At step 700, sensor 300 powers up and is assumed to be positioned against a surface 99. The sensor 300 performs a calibration step 710 to reduce the impact of parasitic circuit and wall capacitances. The calibration step determines a reference value such as a DAC value that represents an absolute capacitance of the wall structure and includes parasitic capacitances of the sensor 300.

At step 720, sensor 300 begins a process of measuring plate capacitances, e.g., determining capacitance measurements in the form of a relative capacitance values from the calibration values. At step 730, the sensor 300 computes a capacitance ratio between plate capacitance measurements from step 720.

At step 740, a sensor 300 determines whether the capacitive measurements of step 720 indicate a centerline 101 of an object or a discontinuity has been detected. That is, if the capacitance ratio is approximately equal to unity, or alternatively, if the capacitance measurements are approximately equal to one another. If so, at step 750, the sensor 300 may provide a visual and/or an audio indication that a centerline 101 of the object or the discontinuity is detected. If not, the process may continue.

At step 760, sensor 300 determines whether the capacitive measurements of step 720 indicate an edge of an object or a discontinuity has been detected. An edge is detected when the capacitance ratio is approximately equal to a transition ratio. If so, at step 770, the sensor 300 provides a visual and/or an audio indication that an edge of the object or the discontinuity is detected. If not, the sensor 300 repeats the process with step 720.

Additionally, sensor 300 determines the relative direction an object or a discontinuity exists based on the relative magnitudes of the measured plate capacitances. For example, the sensor 300 indicates that the stud is positioned to the left of the centerline 304 of the sensor 300. Sensor 300 indicates the direction of an object or a discontinuity audibly and/or visually.

FIG. 18 illustrates a sensor calibration process (step 710 of FIG. 17), in accordance with some embodiments of the present invention. At step 800, calibration begins. At step 810, the sensor and surface are positioned proximally to one another. For example, sensor 300 is placed against a wall or alternatively an object is positioned along side a sensor 300. At step 820, the sensor is enabled. For example, the circuit is powered by a switch controlled by an operator.

At step 830 reference measurements are taken. In some embodiments, a reference measurement is made for each plate, e.g., plate 301 or 302. In some embodiments, a DAC value is determined that causes measurement circuitry to trigger at the same time as a reference circuit having a reference capacitor. With reference to FIG. 14 for example, DAC values 512A and 512B are determined, one for each plate 301 and 302, such that comparators 510A, 510B and 501C simultaneously trigger. A nominal capacitance value of each plate 301 and 302 may be represented by a DAC value 512A and 512B, respectively.

Once the calibration values are stored in step 840, the end of calibration is reached, as shown by step 850.

FIG. 19 shows further sensor processing, in accordance to some embodiments of the present invention. The process begins after calibration with step 900. In step 910, plate capacitance measurements may be made. For example, a change in capacitance from a nominal capacitance, for example, as determined during calibration, may be measured. In step 920, a determination is made as to whether either and/or both of the measurements are above a predetermined floor threshold. If not, the process begins again with step 910.

If capacitance measurements are above a predetermined floor threshold, a capacitor ratio is computed as a ratio between the smaller and the larger of the capacitance values, as shown in step 930. Next, a decision is made as to whether a centerline of a stud is detected, as shown in step 940. If the capacitance values are equal or equal within a predetermine offset, the centerline 304 of a sensor 300 is over a centerline 101 of a stud 100. As shown in step 950, an announcement to a user is made that indicates that a centerline has been found.

If the capacitance values are unequal, a transition ratio is computed, as shown in step 960.

At step 970, the transition ratio is compared to the capacitance ratio. If the transition ratio is equal to capacitance ratio, or within a predetermined offset, an edge is detected. If an edge is detected, the detection of an edge is announced and/or the direction of the edge may be announced as indicated at step 980. In either case, the process repeats with new capacitance measurements at step 910.

A ratiometric capacitive sensor 300 in accordance with the invention may be used to detect a variety of hidden objects in addition to studs and joists. For example, a sensor having long and narrow plates may be used to find a crack or gap hidden behind a surface. Sensor 300 may be used to find a safe hidden behind a wall. Sensor 300 may be used to find brick wall hidden behind sheetrock. Additionally, sensor 300 may be stationary and be positioned to allow objects to pass across its plates.

While the present invention has been described with reference to one or more particular variations, those skilled in the art will recognize that many changes may be made thereto without departing from the spirit and scope of the present invention. Each of these embodiments and obvious variations thereof are contemplated as falling within the scope of the claimed invention, which is set forth in the following claims.

I claim:

1. A method of finding a feature behind a surface using a sensor having first and second plates, the method comprising the acts of:
   moving the sensor and surface adjacent one another;
   measuring a first capacitance of a first capacitor including the first plate;
   measuring a second capacitance of a second capacitor including the second plate; and
   computing a ratio of the first and second capacitances;
   providing an indication of the ratio, and wherein if the indication is approximately one, thereby locating a centerline of the feature.

2. The method of claim 1, further comprising the acts of:
determining a first reference that represents an initial capacitance of the first capacitor; and
determining a second reference that represents an initial capacitance of the second capacitor.

3. The method of claim 2, wherein:
the first capacitance is a difference between the first reference and the first capacitance; and
the second capacitance is a difference between the second reference and the second capacitance.

4. The method of claim 2, wherein:
the first reference is indicative of a duration of time necessary to charge the first plate having the initial capacitance to a first reference;
the second reference is indicative of a duration of time necessary to charge the second plate having the initial capacitance to a second reference;
wherein the first capacitance is a difference between the first reference and a duration of time to charge the first plate to the first reference; and
the second capacitance is a difference between the second reference and a duration of time to charge the second plate to the second reference.

5. The method of claim 4, wherein the first reference equals the second reference.

6. The method of claim 1, wherein the act of moving comprises applying the sensor to the surface.

7. The method of claim 1, the act of moving comprising applying the surface to the sensor.

8. The method of claim 1, wherein the first and second capacitances are indicative of a duration of time necessary to charge a respective one of the first and second plates to a respective reference level.

9. A method of finding a feature behind a surface using a sensor having first and second plates, the method comprising the acts of:
moving the sensor and surface adjacent one another;
measuring a first capacitance of a first capacitor including the first plate;
measuring a second capacitance of a second capacitor including the second plate;
computing a ratio of the first and second capacitances;
determining whether one or more of the first and second capacitances exceeds a threshold; and
re-measuring the first and second capacitances if one or more of the first and second capacitances exceeds the threshold.

10. A method of finding a feature behind a surface using a sensor having first and second plates, the method comprising the acts of:
moving the sensor and surface adjacent one another;
measuring a first capacitance of a first capacitor including the first plate;
measuring a second capacitance of a second capacitor including the second plate;
computing a ratio of the first and second capacitances;
determining whether the ratio is within a predetermined range; and
wherein the predetermined range has fixed boundaries.

11. The method of claim 10, further comprising the act of indicating, if the ratio is within the predetermined range, that an edge of the feature is detected.

12. The method of claim 10, wherein the ratio is a function of a maximum of the first and second capacitances.

13. The method of claim 10, wherein the predetermined range is approximately between 0.32 and 0.45.

14. The method of claim 10, further comprising deriving the predetermined range from a look-up table.

15. The method of claim 10, further comprising generating the predetermined range.

16. The method of claim 10, further comprising the acts of:
comparing the first and second capacitances;
determining that an edge of the feature is closer to a centerline of the first plate than a centerline of the second plate if the first capacitance is greater than the second capacitance; and
determining that the edge is closer to the centerline of the second plate than the centerline of the first plate if the first capacitance is less than the second capacitance.

17. The method of claim 10, wherein the predetermined range is inclusively 0.9 to 1.

18. The method of claim 10, further comprising the act of indicating, if the ratio is within the predetermined range, that a centerline of the feature is detected.

19. The method of claim 10, wherein the first and a second plates are of approximately equal areas, the computing a ratio comprising:
comparing the first and second capacitances; and
repeating the acts of measuring and comparing.

20. The method of claim 19, wherein the act of comparing includes:
computing a ratio between the first and second capacitances;
determining whether the ratio is within a predetermined range ratio; and
indicating, if the ratio is within the range, that an edge of the feature is detected.

21. The method of claim 19, wherein the act of comparing includes:
determining whether the first and second capacitances differ by less than a threshold;
indicating, if the first and second capacitances differ by less than the threshold, that a centerline of an object is detected.

22. The method of claim 19, wherein the act of comparing includes:
computing a ratio between the first and second capacitances;
determining whether the ratio is within a range of inclusively 0.9 to 1.1; and
indicating, if the capacitance ratio is within the range, that a centerline of the feature is detected.

23. A sensor for finding a feature of a structure, comprising:
a first plate having a first capacitance and adapted for forming a first capacitor with the structure;
a second plate having a second capacitance and adapted for forming a second capacitor with the structure;
a first measurement circuit coupled to the first plate, the first measurement circuit measuring a first capacitance value of the first capacitor;
a second measurement circuit coupled to the second plate, the second measurement circuit measuring a second capacitance value of the second capacitor; and
a comparison circuit coupled to the first and second measurement circuits, the comparison circuit generating a ratio of the first and second capacitance values;
an indicator coupled to the comparison circuit thereby to provide an indication of the ratio of the capacitances;
wherein if the indication is that the ratio is approximately one, thereby locating a centerline of the structure.

24. The sensor of claim 23, wherein:
the first capacitance value represents a difference between the first capacitance and an initial capacitance of the first capacitor; and
the second capacitance value represents a difference between the second capacitance and an initial capacitance of the second capacitor.

25. The sensor of claim 23, further comprising threshold circuitry coupled to first and second measurement circuits, the threshold circuitry determining whether the first and second capacitance values are above a threshold.

26. The sensor of claim 23, further comprising a processing circuit coupled to the comparison circuit and coupled to receive the ratio value.

27. The sensor of claim 26, further comprising:
a source of a reference voltage;
wherein the first measurement circuit includes a first index, the first index indicating a number of clock cycles needed to charge the first plate to the reference voltage level; and
wherein the second measurement circuit includes a second index, the second index indicating a number of clock cycles needed to charge the second plate to the reference voltage level.

28. The sensor of claim 27, wherein the first and second measurement circuits respectively include:
a current source coupled to a respective one of the first or second plate;
a discharge switch coupled to the respective one of the first or second plate;
a digital-to-analog converter (DAC) having an input terminal coupled to receive a data signal from the processing circuit and an output terminal; and
a comparator having a first input terminal coupled to the respective one of the first or second plate, a second input terminal coupled to the DAC, and an output terminal providing the output signal of the measurement circuit.

29. The sensor of claim 25 wherein:
the first and a second plates are positioned in about the same plane and spaced apart from one another.

30. A sensor for finding a feature of a structure, comprising:
a first plate having a first capacitance and adapted for forming a first capacitor with the structure;
a second plate having a second capacitance and adapted for forming a second capacitor with the structure;
a first measurement circuit coupled to the first plate, the first measurement circuit measuring a first capacitance value of the first capacitor with respect to a constant reference capacitance;
a second measurement circuit coupled to the second plate, the second measurement circuit measuring a second capacitance value of the second capacitor with respect to the constant reference capacitance; and
a comparison circuit coupled to the first and second measurement circuits, the comparison circuit generating a ratio of the first and second capacitance values;
wherein the processing circuit determines whether the ratio is within a predetermined range which has fixed boundaries.

31. The sensor of claim 30, wherein the processing circuit determines whether the capacitance ratio is within a range of inclusively 0.9 to 1.1.

32. The sensor of claim 31, further including an indicator coupled to the processing circuit, the indicator providing an indication that the sensor is over a centerline of the structure when the ratio is within the range.

33. The sensor of claim 30 wherein the indication is that the ratio is approximately equal to a predetermined ratio, thereby locating an edge of the structure.

34. The sensor of claim 30, further including an indicator coupled to the processing circuit, the indicator providing an indication that the sensor is over an edge of the structure when the ratio is within the predetermined range.

35. The sensor of claim 34, further including a look-up table coupled to the processing circuit, the look-up table providing a transition ratio to the processing circuit, wherein the transition ratio is used to set the predetermined range.

36. A method of finding a feature behind a surface using a sensor having first and second plates, the method comprising the acts of:
moving the sensor and surface adjacent one another;
measuring a first capacitance of a first capacitor including the first plate;
measuring a second capacitance of a second capacitor including the second plate;
computing a ratio of the first and second capacitance;
determining whether the ratio is within a predetermined range of approximately between 0.32 and 0.45; and
indicating if the ratio is within the predetermined range that an edge of the feature is detected.

37. A sensor for finding a feature of a structure, comprising:
a first plate having a first capacitance and adapted for forming a first capacitor with the structure;
a second plate having a second capacitance and adapted for forming a second capacitor with the structure;
a first measurement circuit coupled to the first plate, the first measurement circuit measuring a first capacitance value of the first capacitor;
a second measurement circuit coupled to the second plate, the second measurement circuit measuring a second capacitance value of the second capacitor; and
a comparison circuit coupled to the first and second measurement circuits, the comparison circuit generating a ratio of the first and second capacitance values; and
an indicator coupled to the comparison circuit thereby to provide an indication of the ratio of the capacitances;
wherein if the indication is that the ratio is in the range of approximately 0.32 to 0.45, thereby locating an edge of the structure.

* * * * *